(12) United States Patent
Khalifa et al.

(10) Patent No.: US 12,508,547 B1
(45) Date of Patent: Dec. 30, 2025

(54) SYSTEM FOR DESALINATING WATER WITH MULTIPLE DESALINATION PROCESSES

(71) Applicant: KING FAHD UNIVERSITY OF PETROLEUM AND MINERALS, Dhahran (SA)

(72) Inventors: Atia Esmaeil Atia Khalifa, Dhahran (SA); Mohamed Abdallah Fahmy Kotb, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 19/206,220

(22) Filed: May 13, 2025

(51) Int. Cl.
  *B01D 61/36* (2006.01)
  *B01D 53/26* (2006.01)
  (Continued)

(52) U.S. Cl.
  CPC ....... *B01D 61/3641* (2022.08); *B01D 53/265* (2013.01); *B01D 61/366* (2013.01);
  (Continued)

(58) Field of Classification Search
  CPC .......................... B01D 61/3641; B01D 53/265; B01D 61/366; B01D 69/02; B01D 2257/80;
  (Continued)

(56) References Cited

U.S. PATENT DOCUMENTS

| | | | |
|---|---|---|---|
| 8,647,477 B2 | 2/2014 | Govindan et al. | |
| 2012/0205236 A1* | 8/2012 | Govindan | B01D 1/14 203/11 |

(Continued)

FOREIGN PATENT DOCUMENTS

| | | |
|---|---|---|
| CN | 203256082 U | 10/2013 |
| JP | 2020-40001 A | 3/2020 |
| KR | 10-2016-0004424 A | 1/2016 |

OTHER PUBLICATIONS

Qian Chen, et al.; A novel zero-liquid discharge desalination system based on the humidification-dehumidification process: A preliminary study; Water Research, vol. 207, Oct. 25, 2021; 117794; 12 pages.

*Primary Examiner* — Bobby Ramdhanie
*Assistant Examiner* — Boi-Lien Thi Nguyen
(74) *Attorney, Agent, or Firm* — Oblon, McClelland, Maier & Neustadt, L.L.P.

(57) ABSTRACT

A system for water desalination includes a membrane module and an ejector module. The membrane module includes a feed tank for salt water, a heater, a humidifier receiving heated salt water and a carrier gas to form a wet gas, and a membrane distillation unit. The membrane distillation unit includes a feed chamber, a membrane, and a permeate chamber with a sweeping gas inlet. The membrane allows water vapor to pass from the feed chamber to the permeate chamber. The ejector module includes an ejector and a bubble column dehumidifier. The ejector has first and second inlets for primary and secondary fluid streams, respectively, creating a mixed stream. The bubble column dehumidifier receives the mixed stream to produce fresh water. The second inlet of the ejector receives both wet gas from the humidifier and sweeping gas from the permeate chamber as the secondary fluid stream.

20 Claims, 26 Drawing Sheets

(51) Int. Cl.
*B01D 69/02* (2006.01)
*C02F 1/44* (2023.01)
*C02F 103/10* (2006.01)

(52) U.S. Cl.
CPC .............. *B01D 69/02* (2013.01); *C02F 1/447* (2013.01); *B01D 2257/80* (2013.01); *B01D 2313/243* (2013.01); *B01D 2325/38* (2013.01); *C02F 2103/10* (2013.01)

(58) Field of Classification Search
CPC .......... B01D 2313/243; B01D 2325/38; C02F 1/447; C02F 2103/10
See application file for complete search history.

(56) References Cited

U.S. PATENT DOCUMENTS

| | | | | |
|---|---|---|---|---|
| 2014/0367871 | A1* | 12/2014 | Govindan | B01D 19/0015 |
| | | | | 261/74 |
| 2015/0041127 | A1* | 2/2015 | Kuki | B01D 63/06 |
| | | | | 166/266 |
| 2015/0353377 | A1* | 12/2015 | Al-Sulaiman | C02F 1/043 |
| | | | | 261/114.2 |
| 2021/0260531 | A1* | 8/2021 | Falath | C02F 1/043 |
| 2021/0339197 | A1* | 11/2021 | Mitra | B01D 71/261 |
| 2022/0168664 | A1* | 6/2022 | Lam | B01D 3/346 |
| 2023/0211255 | A1* | 7/2023 | Mikulandric | B01D 5/0054 |
| | | | | 95/39 |
| 2024/0058757 | A1* | 2/2024 | Lawal | C02F 1/447 |

\* cited by examiner

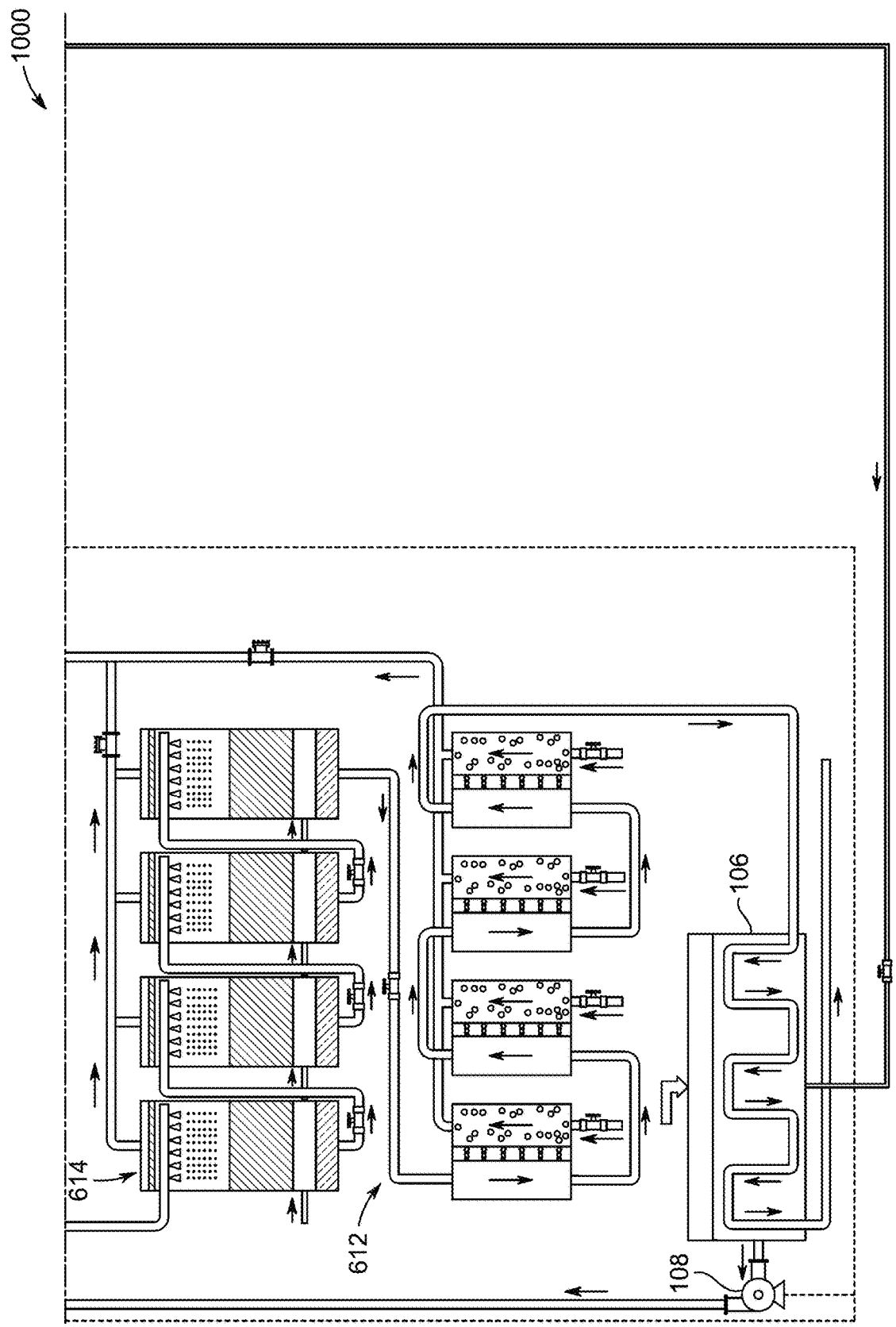

SYSTEM FOR DESALINATING WATER WITH MULTIPLE DESALINATION PROCESSES

CROSS REFERENCE TO RELATED APPLICATIONS

The present disclosure claims the benefit of Saudi Patent Application No. 1020253094, filed May 5, 2025 with the Saudi Authority for Intellectual Property Office, which is incorporated herein by reference in its entirety.

In addition, aspects of the present disclosure are related to Applicant's co-pending patent application Ser. No. 18/901,591 filed on Sep. 30, 2024, titled "SYSTEM FOR DESALINATING WATER WITH SWEEPING GAS MEMBRANE DISTILLATION", which is incorporated herein by reference in its entirety.

BACKGROUND

Technical Field

The present disclosure is directed to water desalination systems, and more specifically to a system for water desalination using a combined humidification-dehumidification process and sweeping gas membrane distillation in conjunction with an ejector module to enhance vapor transfer, improve energy efficiency, and achieve zero-liquid discharge.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Water desalination is a critical process for producing fresh water from high-salinity sources, addressing water scarcity challenges across industries. With the advent of water desalination techniques, various desalination methods have been developed, including thermal and membrane-based processes. Among the aforementioned thermally driven vapor separation processes such as membrane distillation (MD) and humidification-dehumidification (HDH) have gained attention for their ability to treat high-salinity water sources. The mentioned methods rely on temperature-driven phase changes to separate water vapor from dissolved salts, producing fresh water while generating concentrated brine.

Despite advancements in desalination techniques, existing technologies and desalination methods face significant challenges when dealing with highly saline water sources such as produced water from oil and gas extraction, industrial waste water, and zero liquid discharge (ZLD) brine. In general, produced water is a byproduct of hydrocarbon extraction and contains high concentrations of dissolved salts, organic compounds, heavy metals, and other contaminants. The high salinity and complex composition of produced water make conventional treatment methods inefficient and expensive. Disposal and reuse remain critical concerns due to environmental regulations and high treatment costs.

Further, traditional desalination methods such as reverse osmosis (RO) struggle with high-salinity water due to the increased osmotic pressure, which requires additional energy input and leads to faster membrane degradation. Thermal desalination techniques, including multi-stage flash (MSF) and multi-effect distillation (MED), offer high recovery rates but require substantial energy input, rendering them costly to operate. Additionally, brine disposal remains a persistent issue, as an improper discharge may lead to environmental damage and regulatory penalties.

In order to address the challenges listed above, alternative thermally driven desalination processes such as membrane distillation (MD) and humidification-dehumidification (HDH) have been explored. MD and HDH are thermally driven vapor separation processes for water desalination used to separate vapor from a high-salinity water source for producing fresh water while rejecting a high-salt concentration brine. MD operates by creating a temperature difference across a microporous hydrophobic membrane, inducing a vapor pressure gradient that drives water vapor from the hot feed side to the cooler permeate side. The process is particularly effective for treating high-salinity solutions, making it suitable for industrial applications, including oil and gas wastewater treatment, brine concentration for ZLD systems, and brine mining for valuable mineral recovery. However, MD systems often suffer from low thermal efficiency due to heat loss across the membrane, requiring further improvement for large-scale applications. Furthermore, the humidification-dehumidification (HDH) process offers another approach, utilizing a humidifier to transfer water vapor into an air or gas stream, followed by a dehumidifier that condenses the vapor into liquid water. Various humidifier configurations, including packed beds, spray towers, bubble columns, and wetted wall columns, have been developed to improve efficiency. However, HDH systems typically require large system footprints and careful thermal energy management to improve water recovery while reducing energy consumption.

In addition, sweeping gas membrane distillation (SGMD) is a variation of MD that uses a gas, such as air, to carry vapor from the permeate side of the membrane. SGMD method enhances vapor flux and reduces internal conduction heat losses. However, SGMD requires external dehumidification of the carrier gas, adding complexity to the system. The introduction of vacuum in the permeate channel may improve fresh water productivity by reducing resistance to vapor mass transfer, but this approach requires additional equipment, which may further increase operational costs.

Moreover, bubble column dehumidifiers (BCDs) are used in HDH systems to facilitate water condensation. BCD systems inject humid air into a cooler water column, forming bubbles that undergo heat transfer and mass transfer as they rise through the liquid. While BCDs are highly effective and energy-efficient, they require control of temperature and airflow to maintain desirable performance.

Ejectors are commonly used in vacuum applications to enhance desalination processes. Unlike mechanical vacuum pumps, ejectors operate without moving parts, offering high reliability and low maintenance requirements. They are particularly useful in thermal vapor compression cycles applied to single-effect evaporation processes. However, ejectors generally exhibit low efficiency, limiting their effectiveness in large-scale desalination applications.

Although MD, HDH, and related desalination technologies have made significant progress, challenges remain in improving energy efficiency, system scalability, and cost-effectiveness. Current systems require optimization to reduce heat losses, enhance mass transfer rates, and lower operational costs. Additionally, the integration of vacuum-based and gas-assisted techniques introduces complexities that must be addressed to ensure practical deployment in large-scale desalination operations.

JP2020040001A describes a water treatment system that includes a degassing device, a desalination unit employing multiple reverse osmosis membranes, a bubble generating device, and a bubble transferring device. This system focuses on reverse osmosis for desalination.

U.S. Pat. No. 8,647,477B2 describes a system where a carrier gas is directed through an evaporator to produce a humidified gas flow. This humidified flow is then compressed using a thermal vapor compressor, such as a steam jet ejector, and subsequently directed through a condenser to collect condensed water. The humidified gas flow is used as the primary fluid in the ejector.

KR20160004424A describes a forward osmosis desalination device that uses a semipermeable membrane to create a diluted draw solution. This diluted solution is then sprayed by an ejector into a humidifying device, where it contacts a dry carrier gas. This reference focuses on forward osmosis and uses the ejector to introduce the diluted draw solution to the humidifier.

CN203256082U describes an atomizing humidification and dehumidification device. This device includes an evaporation chamber, a condensation chamber, and a gas injector positioned between them. High-speed airflow from an ultrasonic nozzle atomizes the seawater. The humidified gas from the evaporation chamber is injected into the ejector as the primary gas flow.

Chen et al. ("A novel zero-liquid discharge desalination system based on the humidification-dehumidification process: A preliminary study") describe a crystallization system that includes two direct-spray humidifiers, a dehumidifier/condenser, an air heater, and a salt/brine separator. This reference focuses on a crystallization process for zero-liquid discharge.

Each of the aforementioned approaches suffers from one or more drawbacks hindering their adoption, primarily inability to handle high-salinity water sources while reducing energy consumption and operational challenges. Particularly, none of these references describes a system combining a humidifier with a membrane distillation unit with an ejector receiving wet gas from the humidifier and sweeping gas from the membrane distillation unit. Technologies that improve heat utilization, enhance vapor transport, and simplify system architecture can provide significant advantages in treating produced water, industrial waste water, and other high-salinity streams. Addressing these challenges is essential for advancing sustainable desalination technologies that meet environmental and economic requirements.

Accordingly, it is one object of the present disclosure to provide a desalination system for treating high-salinity water and concentering water for zero-liquid discharge and brine mining applications, with low energy consumption.

SUMMARY

In an exemplary embodiment, a system for water desalination is described. The system includes a membrane module and an ejector module. The membrane module includes a feed tank configured to receive salt water, a heater configured to heat the salt water from the feed tank, a humidifier configured to receive the salt water from the heater and a carrier gas to form a wet gas including the carrier gas and water moisture from the salt water, and a membrane distillation unit including in order, a feed chamber, a membrane and a permeate chamber. The feed chamber is configured to receive the salt water from the humidifier. The membrane is configured to let water vapor pass from the feed chamber through the membrane to the permeate chamber. The permeate chamber includes an inlet configured to receive a sweeping gas. The ejector module includes an ejector including a first inlet configured to receive a primary fluid stream and a second inlet configured to receive a secondary fluid stream so that the primary fluid stream and the secondary fluid stream mix to form a mixed stream. The ejector module also includes a bubble column dehumidifier configured to receive the mixed stream to form fresh water. The second inlet of the ejector is connected to an outlet of the humidifier and an outlet of the permeate chamber so that the ejector is configured to receive the wet gas and the sweeping gas as the secondary fluid stream.

In some embodiments, the bubble column dehumidifier is configured to discharge a remaining gas of the mixed stream, which is divided into at least three separate portions that are recycled respectively as the sweeping gas, the carrier gas and the primary fluid stream.

In some embodiments, the humidifier includes a packed bed humidifier configured to spray the salt water onto a packed bed.

In some embodiments, the sweeping gas is air.

In some embodiments, the inlet of the permeate chamber is configured to receive the air from a surrounding environment.

In some embodiments, the inlet of the permeate chamber includes a pressure valve configured to regulate flow of the air.

In some embodiments, the membrane is a hydrophobic microporous membrane.

In some embodiments, the membrane module further includes a water circulation pump.

In some embodiments, an outlet of the feed tank is operationally connected to an inlet of the water circulation pump. An outlet of the water circulation pump is operationally connected to an inlet of the heater. An outlet of the heater is operationally connected to an inlet of the feed chamber. An outlet of the feed chamber is operationally connected to an inlet of the feed tank.

In some embodiments, the primary fluid stream includes air, and the ejector module further includes an air blower.

In some embodiments, an inlet of the air blower is configured to receive the air from a surrounding environment. An outlet of the air blower is operationally connected to the first inlet of the ejector. An outlet of the ejector is operationally connected to an inlet of the bubble column dehumidifier.

In some embodiments, the bubble column dehumidifier includes n number of stages, wherein n is an integer from 1 to 100. Each stage includes a bubble column. A first stage is operationally connected to the outlet of the ejector to receive the mixed stream and is configured to capture a portion of the water vapor in the mixed stream to form desalinated water. Each bubble column includes a vapor outlet through which a portion of the water vapor that is not captured in one stage is configured to pass to a next stage. Each bubble column includes a desalinated water outlet operationally connected to the bubble column dehumidifier to collect the desalinated water.

In some embodiments, the system further includes a fan that is adjacent to the bubble column dehumidifier.

In some embodiments, a vapor outlet of a bubble column of a final stage of the bubble column dehumidifier is operationally connected to the inlet of the air blower.

In some embodiments, the membrane module further includes a power source configured to power the heater.

In some embodiments, the power source includes a waste heat source, a solar power collector, an electrical heater or a combination thereof.

In some embodiments, the system further includes a control unit configured to control at least one selected from the group consisting of a temperature of the salt water in the heater, a flow rate of the salt water, and a water level in the feed tank.

In some embodiments, the humidifier is a multi-stage humidifier.

In some embodiments, the membrane distillation unit is a multi-stage membrane distillation unit.

In some embodiments, the ejector is a multi-stage ejector.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings.

FIGS. 10A, 10B and 10C show parts of a system for water desalination for a serial feed stream with heat recovery using the feed makeup stream, according to certain embodiments.

DETAILED DESCRIPTION

Figure 1A:
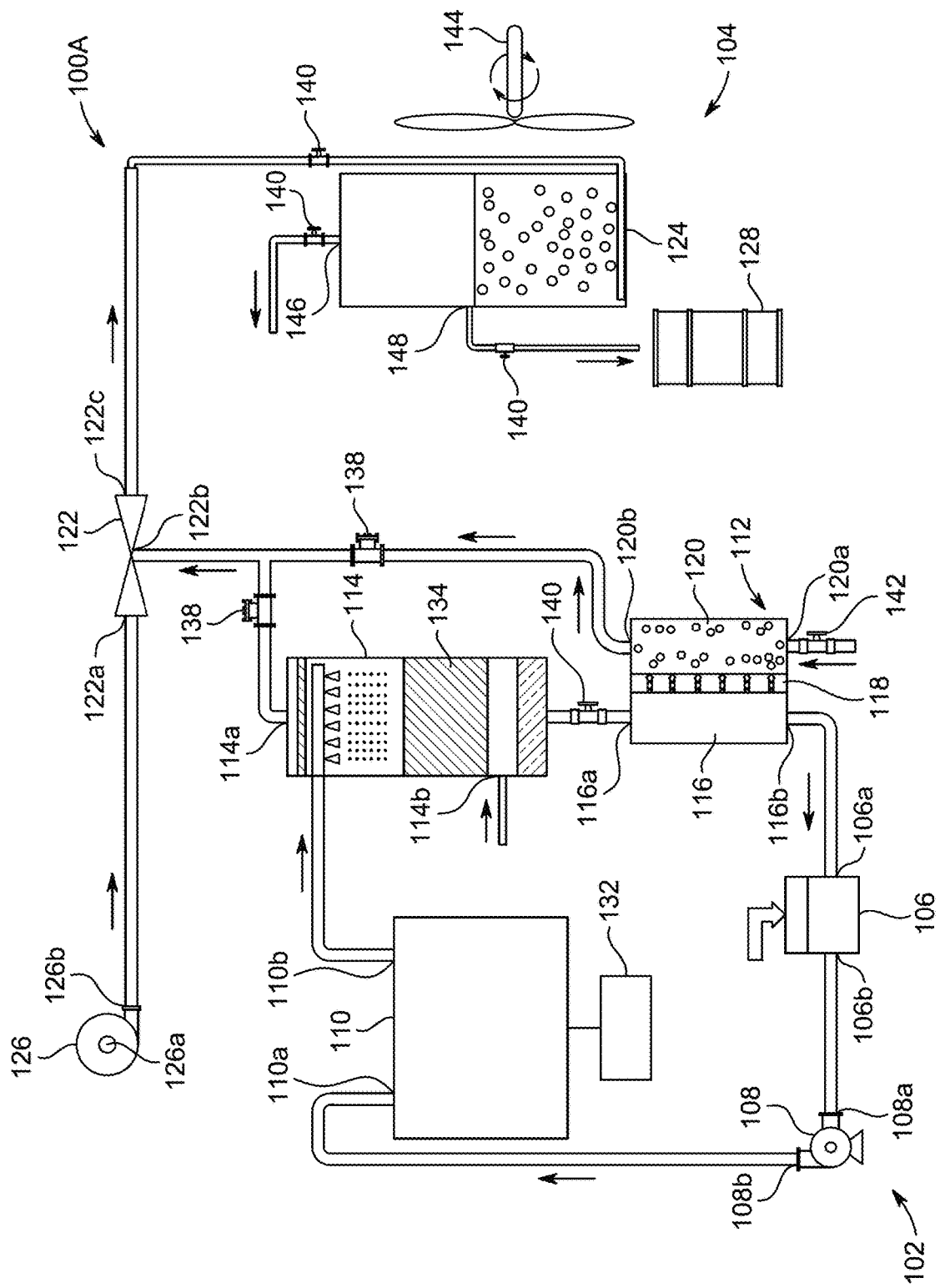
FIG. 1A is an exemplary schematic diagram of a system for water desalination utilizing a humidifier, a membrane distillation unit, and an air ejector in an open air cycle, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Techniques herein provide a system that integrates a vacuum-assisted sweeping air membrane distillation module and a vacuum-operated air humidifier, in conjunction with an ejector and a bubble column dehumidifier unit for air dehumidification and collection of fresh water. This system aims to enhance the overall efficiency and effectiveness of the desalination process and treat high salinity water and ZLD and brine mining applications.

Aspects of this disclosure are directed to a system for water desalination that integrates a humidification-dehumidification process with membrane distillation, utilizing an ejector module to create vacuum conditions and enhance vapor transfer efficiency. The system leverages complementary technologies of humidification and membrane separation to achieve higher efficiency and effectiveness in treating saline water sources with varying degrees of salt concentration. The integration of these processes allows for a water treatment solution capable of addressing challenges that individual desalination methods cannot efficiently resolve alone. The system architecture enables enhancement of thermal energy utilization across multiple stages while reducing the reliance on mechanical vacuum pumps, thereby reducing operational costs and complexity. The operation of the humidifier, the membrane distillation unit, and the ejector components creates synergistic benefits that enhance overall system performance compared to conventional desalination approaches. Furthermore, the modularity of the system allows for scalable implementations ranging from small-scale operations to industrial applications, providing flexibility in deployment across different operational contexts and requirements.

For purpose of the present disclosure, salt water or produced water is a high salinity water, which is usually a byproduct of oil and gas extraction processes. Such water contains a high concentration of salts, minerals, and other dissolved substances, making it significantly more saline than seawater. This water poses challenges for disposal and reuse due to its environmental impact and the cost of treatment required to make it suitable for other uses. Proper management and treatment of produced water are essential to mitigate its environmental footprint and to comply with regulatory standards.

Zero Liquid Discharge (ZLD) is a wastewater management strategy that aims to eliminate any liquid waste by recovering all the water for reuse and converting the remaining solids into manageable byproducts. This process involves advanced treatment techniques such as evaporation and crystallization to ensure no liquid is discharged into the environment. ZLD is particularly valuable in industries where water scarcity or stringent environmental regulations are of concern. While effective, the implementation of ZLD can be complex and costly, requiring careful consideration of its economic and operational impacts. The zero-liquid discharge approach aligns with sustainable practices by reducing water waste, reducing environmental impact, and promoting sustainable development. It also helps industries comply with strict environmental regulations by eliminating liquid discharge, thereby avoiding potential fines and penalties.

Brine mining is a process of extracting valuable minerals and elements from highly concentrated saltwater, known as brine. This method is particularly used to recover resources such as lithium, potassium, magnesium, and other salts or minerals that are dissolved in saline solutions. Brine mining is seen as an increasingly important method for sourcing critical materials as demand for green technologies such as electric vehicles and renewable energy storage grows.

A humidification-dehumidification (HDH) desalination system includes a humidifier, a dehumidifier, and fluid transfer components such as pumps and fans. In conventional HDH procedures, both humidifiers and dehumidifiers run at atmospheric pressure. The humidifier, which can take different forms (e.g., a tower), promotes the interaction of evaporated saline water with an air stream (or other carrier gases such as Ar, He, or $CO_2$). Water diffuses into the air/gas until saturation occurs. Humidifiers of various designs exist, including packed beds with different fillings, spray towers, bubble columns, or wetted wall columns. It may be noted that various humidifier designs have been shown to increase the moisture content of the leaving air/gas. Furthermore, during the humidification process within the humidifier, the latent heat of water vapor is released when it comes in contact with the process air, causing a cooling effect and lowering the water temperature. In the dehumidifier, humid air is dehumidified and cooled. Various designs of heat exchangers are employed for this purpose, including plate-fin tubes, bubble columns, and desiccant types.

Membrane distillation (MD) and humidification-dehumidification (HDH) are thermally driven vapor separation processes for water desalination used to separate vapor from a high-salinity water source for producing fresh water while rejecting a high-salt concentration brine. In the MD process, heated saline feed water flows over a microporous hydrophobic membrane. In contrast, the other side of the membrane (permeate side) is maintained at a lower temperature compared to the feed side. The difference in temperature between the two sides of the membrane creates a vapor pressure gradient that allows water vapor to pass through the membrane pores (permeates) from the hot feed side to the permeate side of the membrane. One of the advantages of the MD process is its ability to treat feed solutions with high salt concentrations, making it suitable for treating the oil & gas produced water, industrial waste water, and zero liquid discharge (ZLD) & brine mining applications.

Sweeping gas membrane distillation (SGMD) is one of the MD process configurations where the permeate side of the membrane typically employs a gas (usually air as) as a vapor carrier which travels through the membrane permeate side to sweep the vapor separated by the membrane. As the air passes the permeate side of the MD module, it undergoes a heating and humidification process by the permeated vapor transported through the membrane. Subsequently, the humidified air necessitates external dehumidification, which can be achieved through various techniques and devices. The SGMD technique exhibits favorable characteristics of high vapor flux and diminished internal conduction heat losses. By incorporating vacuum in the permeate (air) channel of the SGMD module, the freshwater productivity is improved by reducing the resistance to vapor mass transfer across the membrane.

Bubble column dehumidifier (BCD) is a simple and effective technique used for air dehumidification processes due to its simplicity, lower cost, lower energy consumption, and higher effectiveness compared with conventional dehumidification techniques. In the BCD, humid air is injected into a water column at a lower temperature compared to the humid air. Bubbles are formed and move up in the water column where heat transfer and mass transfer take place due to the differences in temperatures and vapor concentration between the bubbles and the water column. The reported effectiveness of BCDs is above 90% and increases as the water column temperature is kept low, for example by cooling.

Ejectors, liquid and gas, are used in many industries to create different levels of vacuum. Compared to vacuum pumps, ejectors exhibit several advantageous features, notably, the lack of mechanical moving parts making them highly reliable and reducing the need for frequent maintenance, with cleaning being the primary requirement. Additionally, ejectors are readily available in the market and are characterized by low operating costs since they do not consume input power. Moreover, ejectors demonstrate exceptional operational reliability over extended periods and can handle humid air without encountering significant challenges that exist when using vacuum pumps with vapor. An ejector represents a practical and commonly employed solution for generating a vacuum, particularly in the context of thermal vapor compression cycles applied to single-effect evaporation processes. Consequently, when considering large-scale operations aimed at mass production, the utilization of ejectors is often preferred. However, it is worth noting that the efficiency of ejectors is relatively low.

The system for water desalination of the present disclosure can be configured for treating high-salinity water sources such as produced water from oil and gas extraction, industrial wastewater streams, and concentrated brines. The multi-component configuration integrates the principles of humidification-dehumidification (HDH) and sweeping gas membrane distillation (SGMD) into a process flow that improves water recovery while reducing energy consumption. The system design centers on vacuum-assisted operation, in which an ejector module creates vacuum conditions without requiring conventional vacuum pumps, thus simplifying the system architecture while improving reliability and reducing maintenance requirements. By incorporating both a packed bed humidifier and a membrane distillation unit, the system creates a dual desalination process capable of progressive salt concentration, making it particularly suitable for zero-liquid discharge (ZLD) applications and brine mining operations where valuable minerals can be recovered from concentrated streams. The operational flexibility of the system allows for both open and closed air cycles, enabling adaptation to varying environmental conditions and application requirements without compromising performance. Additionally, the system allows for integration with renewable energy sources such as solar collectors or waste heat utilization pathways. The modular construction approach facilitates scaling of the system to match specific capacity requirements, with options for serial or parallel configurations of components providing further adaptability to process demands and space constraints.

Referring to FIG. 1A, illustrated is an exemplary schematic diagram of a system for water desalination (represented by reference numeral 100A, and hereinafter referred to as "system 100A"), according to certain embodiments. The system 100A incorporates a dual-stage desalination process utilizing both humidification-dehumidification and membrane distillation principles. The system 100A includes a membrane module 102 and an ejector module 104. The membrane module 102 includes a feed tank 106, a water circulation pump 108, a heater 110, a humidifier 114, and a membrane distillation unit 112, while the ejector module 104 includes an air ejector 122 and a bubble column dehumidifier 124. The system 100A is configured as an open air cycle where atmospheric air enters the system 100A and, after processing, exits back to the atmosphere. This configuration allows for continuous operation using fresh air as the carrier gas and sweeping gas for the desalination process.

In the system 100A, the feed tank 106 is configured to receive salt water. The feed tank 106 is designed to store salt water and supply it to the rest of the membrane module 102 of the system 100A. The feed tank 106 is operationally connected to the water circulation pump 108 that facilitates the movement of salt water through the system 100A. The water circulation pump 108 directs the salt water to the heater 110. The heater 110 is configured to heat the salt water from the feed tank 106. As illustrated, the membrane module 102 further includes a power source 132 configured to power the heater 110. In present examples, the power source 132 includes a waste heat source, a solar power collector, an electrical heater or a combination thereof. The heater 110 is configured to heat the salt water to a temperature range suitable for efficient vapor production, e.g. from 50 to 90° C., preferably from 60 to 80° C., preferably from 65 to 75° C. The heated salt water is then directed to the humidifier 114, where it comes into contact with a carrier gas, typically air. The humidifier 114 is configured to receive the salt water from the heater 110 and a carrier gas to form a wet gas including the carrier gas and water moisture from the salt water. The humidifier 114 is configured as a packed bed humidifier in which the salt water is sprayed onto a packed bed material 134. The carrier gas, drawn from the atmosphere in this open air cycle configuration, passes through the packed bed material 134 in a direction opposite to the falling hot saline water. This countercurrent flow arrangement improves heat and mass exchange within the packed bed material 134, allowing the carrier gas to become heated and humidified as it absorbs water vapor from the salt water. The humidified carrier gas, now referred to as a wet gas, exits the humidifier 114 through an outlet 114a. Meanwhile, the salt water that has not evaporated, which now has a higher salt concentration, collects at the bottom of the humidifier 114.

The concentrated salt water from the humidifier 114 is directed to the membrane distillation unit 112 for further water extraction. The membrane distillation unit 112 includes, in order, a feed chamber 116, a membrane 118, and a permeate chamber 120. The feed chamber 116 is configured to receive the concentrated salt water from the humidifier 114. In some embodiments, the membrane 118 is a hydrophobic microporous membrane. The membrane 118, configured as the hydrophobic microporous membrane, is positioned between the feed chamber 116 and the permeate chamber 120. The hydrophobic nature of the membrane 118 prevents liquid water from passing through while allowing water vapor to traverse the membrane pores. The membrane 118 is configured to let water vapor pass from the feed chamber 116 through the membrane 118 to the permeate chamber 120. The permeate chamber 120 includes an inlet 120a configured to receive a sweeping gas such as air. In the open air cycle configuration of FIG. 1A, the inlet 120a of the permeate chamber 120 is configured to receive the air from a surrounding environment. In some embodiments, the inlet 120a of the permeate chamber 120 includes a pressure valve 142 configured to regulate the flow of the air, allowing for adjustment of the pressure differential across the membrane 118.

Specifically, an outlet 106b of the feed tank 106 is operationally connected to an inlet 108a of the water circulation pump 108. An outlet 108b of the water circulation pump 108 is operationally connected to an inlet 110a of the heater 110. An outlet 110b of the heater 110 is operationally connected to an inlet 116a of the feed chamber 116. An outlet 116b of the feed chamber 116 is operationally connected to an inlet 106a of the feed tank 106. The salt water circulation within the membrane module 102 follows a defined path to facilitate heating and desalination. Salt water stored in the feed tank 106 exits through the outlet 106b, which is directly connected to the inlet 108a of the water circulation pump 108. The water circulation pump 108 then increases the pressure of the salt water and forces it out through the outlet 108b. This outlet 108b is connected to the inlet 110a of the heater 110, delivering the salt water for heating. The heated salt water exits the heater 110 through the outlet 110b, which is connected to the inlet 116a of the feed chamber 116 within the membrane distillation unit 112. After passing through the feed chamber 116, the concentrated salt water exits through the outlet 116b, which is connected back to the inlet 116a of the feed tank 106, thus closing the circulation loop. The sweeping gas flows through the permeate chamber 120, collecting water vapor that has permeated through the membrane 118 from the feed chamber 116. The water-laden sweeping gas then exits the permeate chamber 120 through an outlet 120b, while the further concentrated salt water exits the feed chamber 116 through the outlet 116b and returns to the feed tank 106 to complete the salt water circulation loop.

The ejector module 104 of the system 100A includes the air ejector 122 with a first inlet 122a configured to receive a primary fluid stream and a second inlet 122b configured to receive a secondary fluid stream. Herein, the primary fluid stream includes air. The ejector module 104 further includes an air blower 126. The primary fluid stream is air supplied by the air blower 126, which draws air from the surrounding environment. An inlet 126a of the air blower 126 is configured to receive air from the surrounding environment. An outlet 126b of the air blower 126 is operationally connected to the first inlet 122a of the air ejector 122. An outlet 122c of the air ejector 122 is operationally connected to an inlet of the bubble column dehumidifier 124. Herein, the air blower 126 accelerates the air to a high velocity before it enters the first inlet 122a of the air ejector 122. The second inlet 122b of the air ejector 122 is connected to both the outlet 114a of the humidifier 114 and the outlet 120b of the permeate chamber 120, allowing the air ejector 122 to receive both the wet gas from the humidifier 114 and the water-laden sweeping gas from the permeate chamber 120 as the secondary fluid stream.

As the high-velocity primary air stream passes through the air ejector 122, it creates a vacuum effect at the second inlet 122b, drawing in the secondary fluid stream. The primary fluid stream and the secondary fluid stream mix within the air ejector 122 to form a mixed stream that exits through the outlet 122c of the air ejector 122. The vacuum created by the air ejector 122 is beneficial for the operation of the system 100A, as it eliminates the need for conventional vacuum pumps while still providing the reduced pressure for efficient vapor transport in both the humidifier 114 and the membrane distillation unit 112.

The mixed stream from the air ejector 122, containing water vapor from both the humidifier 114 and the membrane distillation unit 112, is directed to the bubble column dehumidifier 124. The bubble column dehumidifier 124 is configured to receive the mixed stream to form fresh water. Specifically, the bubble column dehumidifier 124 is configured to capture the water vapor from the mixed stream to form desalinated water. The bubble column dehumidifier 124 functions by injecting the mixed stream into a water column maintained at a lower temperature than the mixed stream. As the mixed stream forms bubbles that rise through the water column, heat transfer and mass transfer occur due to the temperature and vapor concentration differences between the bubbles and the surrounding water. This process causes the water vapor in the mixed stream to condense and be captured as fresh water. The fan 144 is positioned adjacent to the bubble column dehumidifier 124 to enhance the cooling of the bubble column dehumidifier 124, thereby improving dehumidification efficiency of the bubble column dehumidifier 124. In particular, herein, the bubble column dehumidifier 124 includes a bubble column with a vapor outlet 146 through which uncaptured water vapor passes. Additionally, the bubble column dehumidifier 124 includes a desalinated water outlet 148 connected to a freshwater collection system 128. In the open air cycle configuration of FIG. 1A, after the air stream is dehumidified in the bubble column dehumidifier 124, it is released back to the atmosphere through the vapor outlet 146 of the bubble column dehumidifier 124.

Additionally, the system 100A may include a non-return valve 138 positioned in the air flow path to prevent backflow and maintain directional integrity of the air and vapor movements. The non-return valve 138 ensures that the vacuum created by the air ejector 122 affects only the intended component(s) e.g. the membrane distillation unit 112, preventing pressure equalization that would reduce the efficiency of the vacuum effect. The system 100A may also include flow control valves (e.g. 140 and 142) that allow operators to adjust the flow rates through different parts thereof, enabling fine-tuning of other parameters and improving the overall performance of the desalination process. This adjustability is particularly valuable when the properties of the feed water change over time, such as increasing salinity as concentration progresses, as it allows the system 100A to adapt to these changing conditions without requiring hardware modifications.

Figure 1B:
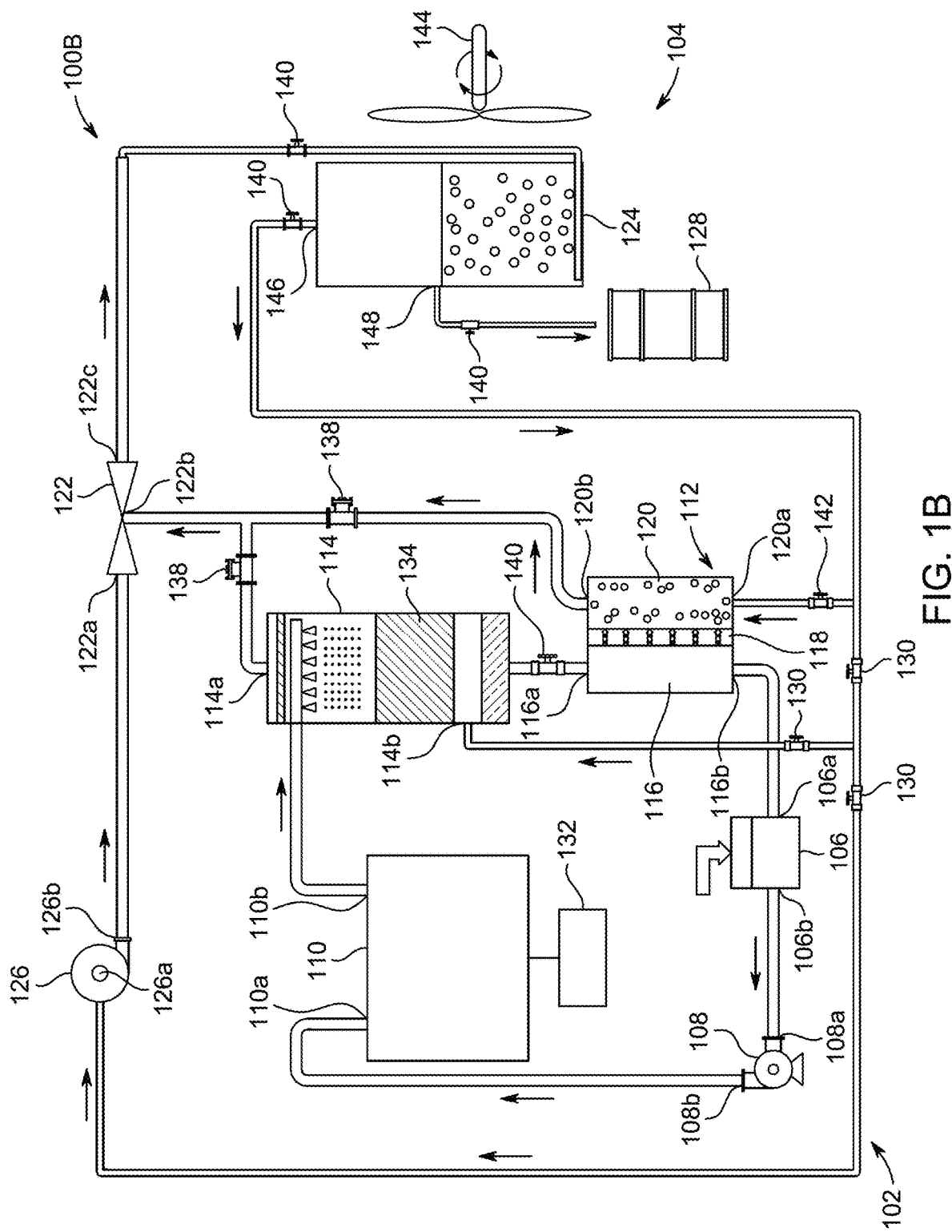
FIG. 1B is an exemplary schematic diagram of a system for water desalination utilizing a humidifier, a membrane distillation unit, and an air ejector in a closed air cycle, according to certain embodiments.

Referring to FIG. 1B, illustrated is an exemplary schematic diagram of a system for water desalination (represented by reference numeral 100B, and hereinafter referred to as "system 100B"), according to certain embodiments. The system 100B is similar to the system 100A shown in FIG. 1A but is configured as a closed air cycle rather than an open air cycle. In the closed air cycle configuration, the vapor outlet 146 of the bubble column dehumidifier 124 is operationally connected to the inlet 126a of the air blower 126, an inlet 114b of the humidifier 114 for the carrier gas, and the inlet 120a of the permeate chamber 120 for the sweeping gas. This closed loop arrangement recirculates the same gas volume continuously through the system 100B, rather than drawing in fresh air from the atmosphere and discharging it after dehumidification. In some embodiments, the recirculated air emerging from the bubble column dehumidifier 124 has been significantly dehumidified, making it effective for reuse in the desalination process.

The closed air cycle configuration of the system 100B offers some advantages over the open air cycle of the system 100A. By recirculating the same air volume, the system 100B becomes less dependent on ambient air conditions such as humidity, temperature, and contaminant levels. This independence from atmospheric conditions provides more consistent operation across varying environmental settings. The closed air cycle also allows for better control of air quality within the system 100B, as the same air is continuously processed and filtered through the desalination components. In environments where air quality is poor or where the atmosphere contains contaminants that could affect the desalination process, the closed air cycle isolates the operational air from these external factors. Additionally, the closed air cycle may improve energy efficiency of the system 100B by retaining and reusing thermal energy that would otherwise be lost to the atmosphere in an open cycle configuration.

In the system 100B, control valves 130 are positioned at strategic points in the air circulation path to manage the flow distribution of the recirculated air. The air exiting the bubble column dehumidifier 124 is divided into three separate portions through these control valves 130. The first portion is directed to the air blower 126 to serve as the primary fluid stream for the air ejector 122. The second portion is routed to the inlet 114b of the humidifier 114 to function as the carrier gas for the humidification process. The third portion is channeled to the inlet 120a of the permeate chamber 120 to act as the sweeping gas. The bubble column dehumidifier 124 is configured to discharge a remaining gas of the mixed stream, which is divided into at least three separate portions that are recycled respectively as the sweeping gas, the carrier gas and the primary fluid stream. These control valves 130 can be adjusted to control the air flow distribution based on operational requirements and performance parameters of the system 100B. The proportional allocation of the recirculated air among these three pathways can influence the efficiency of vapor generation in the humidifier 114, vapor transport across the membrane 118, and vapor extraction through the air ejector 122. By balancing these air flows, the system 100B can be configured to improve water production while reducing energy consumption.

Figure 2:
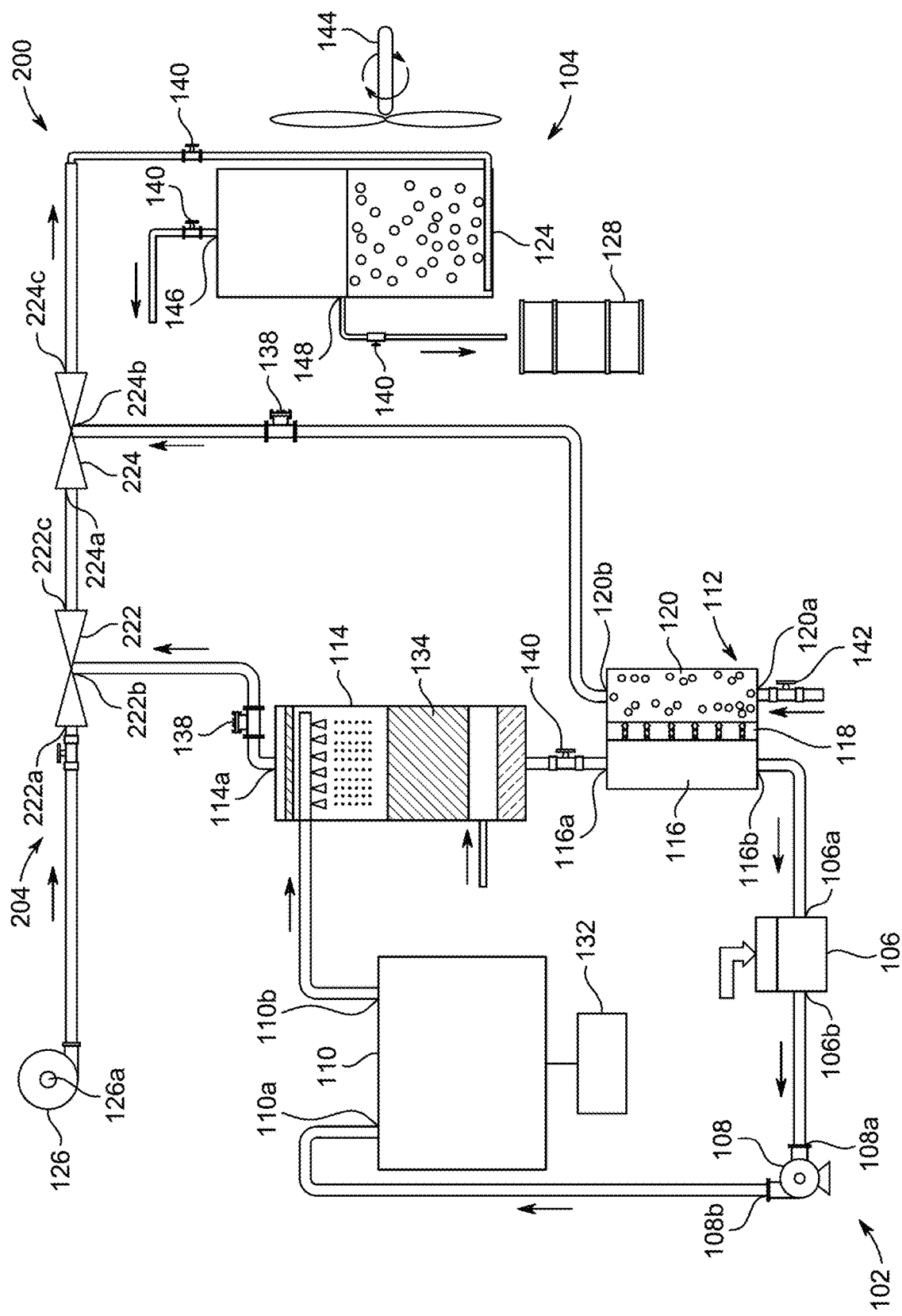
FIG. 2 is an exemplary schematic diagram of a system for water desalination utilizing two air ejectors connected in series for higher vacuum in the membrane distillation module, according to certain embodiments.

Referring to FIG. 2, illustrated is an exemplary schematic diagram of a system for water desalination (represented by reference numeral 200, and hereinafter referred to as "system 200"), according to certain embodiments. The system 200 utilizes two air ejectors connected in series with create an escalating vacuum for the membrane distillation unit 112. The embodiment of the system 200 is similar to embodiments of the systems 100A and 100B. Note that similar or identical components are labeled with similar or identical numerals in the present disclosure unless specified otherwise. Descriptions that have been provided before will be omitted for simplicity purposes.

As shown in FIG. 2, the system 200 includes an ejector module 204 that incorporates two air ejectors arranged in series: a first air ejector 222 and a second air ejector 224. This serial arrangement of air ejectors can be designed to create progressively higher vacuum levels, particularly at the permeate chamber 120 of the membrane distillation unit 112, thereby enhancing vapor extraction and improving overall desalination efficiency.

In the system 200, the air blower 126 draws air from the atmosphere and directs it to a first inlet 222a of the first air ejector 222. The high-velocity air from the air blower 126 creates a vacuum at a second inlet 222b of the first air ejector 222, which is connected to the outlet 114a of the humidifier 114. This vacuum draws the wet gas (humidified air) from the humidifier 114 into the first air ejector 222, where it mixes with the primary air stream. The resulting mixture exits from an outlet 222c of the first air ejector 222 and is directed to a first inlet 224a of the second air ejector 224. The increased mass flow rate at the first inlet 224a of the second air ejector 224, compared to the original flow from the air blower 126 alone, enhances the vacuum-generating capability of the second air ejector 224. A second inlet 224b of the second air ejector 224 is connected to an outlet 120b of the permeate chamber 120 of the membrane distillation unit 112. The enhanced vacuum at the second inlet 224b draws a greater amount of water vapor from the permeate chamber 120, improving the efficiency of the membrane distillation process. The combined streams exit from an outlet 224c of the second air ejector 224 and flow to the bubble column dehumidifier 124 for water vapor condensation and freshwater collection.

The serial arrangement of air ejectors in the system 200 creates a cascade effect where the vacuum level increases progressively through the system 200. The vacuum level at the permeate chamber 120 is greater than the vacuum level at the humidifier 114 due to this arrangement. The enhanced vacuum at the permeate chamber 120 reduces the resistance to vapor mass transfer across the membrane 118, which is particularly important when dealing with high-salinity feed water. As salt concentration increases in the feed chamber 116, the phenomenon of concentration polarization can occur at the membrane surface, hindering vapor flux through the membrane 118. The higher vacuum in the permeate chamber 120 counteracts this effect by providing a stronger driving force for vapor transport. The system 200 may be particularly effective when processing feed water with high salt concentrations, making the system 200 particularly suitable for later stages of brine concentration and zero liquid discharge applications.

Figure 3A:
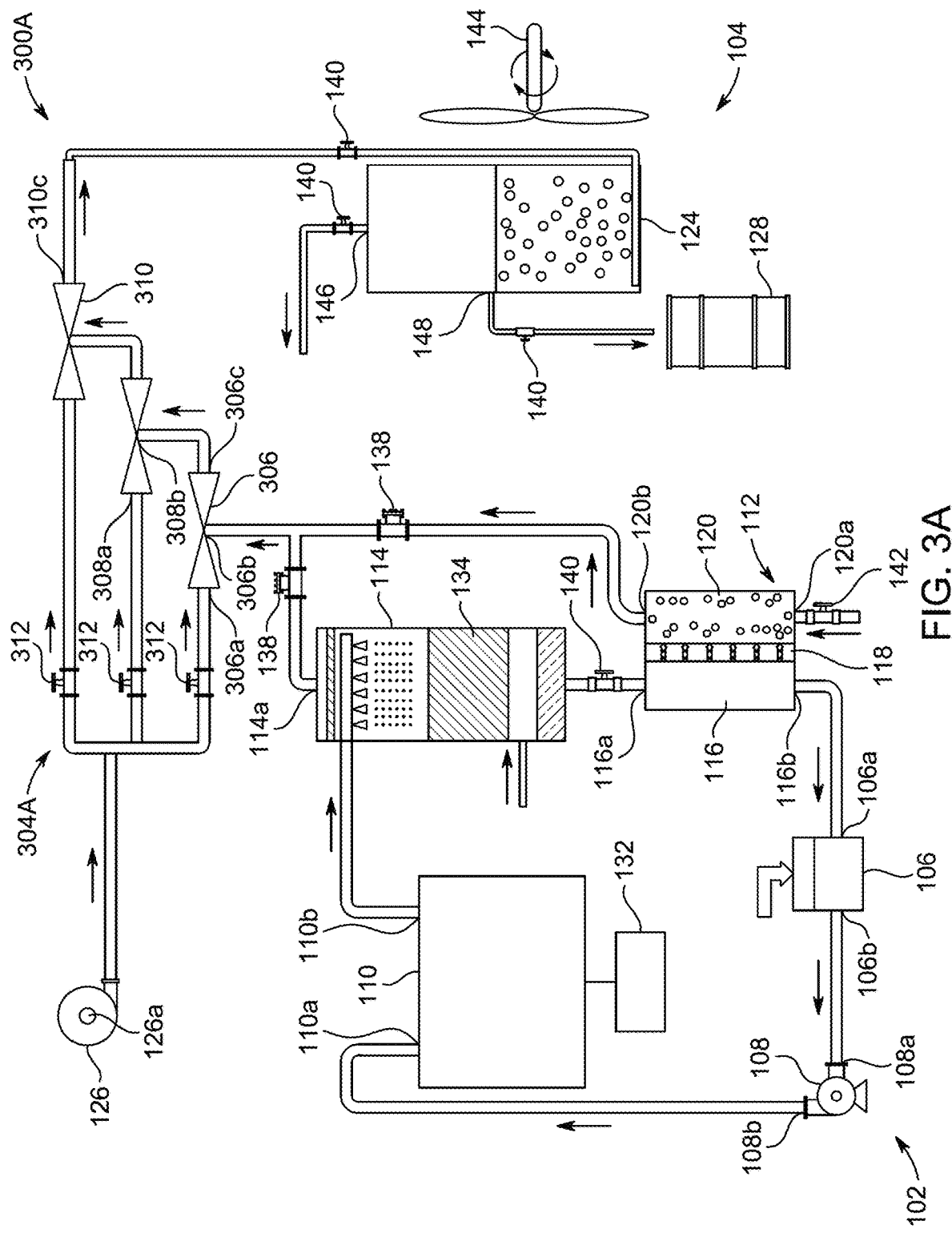
FIG. 3A is an exemplary schematic diagram of a system for water desalination utilizing multiple air ejectors, according to certain embodiments.

Referring to FIG. 3A, illustrated is an exemplary schematic diagram of a system for water desalination (represented by reference numeral 300A, and hereinafter referred to as "system 300A"), according to certain embodiments. The system 300A employs multiple air ejectors connected in series with achieve higher vacuum levels in both the humidifier 114 and the membrane distillation unit 112. The system 300A includes the membrane module 102 with the feed tank 106, the water circulation pump 108, the heater 110, the humidifier 114, and the membrane distillation unit 112, similar to previously described embodiments. The system 300A includes an ejector module 304A that incorporates three or more air ejectors 306, 308, 310 connected in series, each with its associated control valves 312, forming a multi-stage vacuum generation system. This configuration enables the creation of higher vacuum levels than those achievable with one or two ejectors, making the system 300A suitable for large-scale operations and treatment of highly saline waters.

In the system 300A, the air blower 126 supplies a high-velocity air stream to a first inlet 306a of the first air ejector 306. This creates a vacuum at a second inlet 306b of the first air ejector 306, drawing in a portion of the vapor from the humidifier 114 and/or the membrane distillation unit 112. The mixed stream exiting from an outlet 306c of the first air ejector 306 then serves as the secondary flow for the second air ejector 308, entering through a second inlet 308b of the second air ejector 308, while the second air ejector 308 also draws air as the primary flow from the air blower 126 via a first inlet 308a. This process continues through subsequent ejectors, with each stage creating a progressively stronger vacuum. A mixed stream, containing the extracted vapor, exits from an outlet 310c of the third air ejector 310c and is directed to the bubble column dehumidifier 124 for water vapor condensation and freshwater collection.

The control valves 312 of the system 300A allow for independent regulation of air flow rates to and from each air ejector. These control valves 312 can be adjusted based on operational requirements to control the vacuum levels at different points in the system 300A. For example, by controlling the flow to the first inlet 306a of the first air ejector 306, operators can adjust the baseline vacuum level that is subsequently enhanced by later ejector stages. Similarly, by controlling the flow distribution between the humidifier 114 and the membrane distillation unit 112 at the vacuum inputs via valves 138, operators can prioritize vapor extraction from one component over the other based on current process needs. This flexibility in vacuum distribution is particularly valuable for handling feed water with varying characteristics or for adapting the system 300A to different production requirements without hardware modifications.

The system 300A can be used for handling larger volumes of vapor and creating higher vacuum levels than simpler configurations, making it suitable for industrial-scale desalination operations. The progressive increase in vacuum strength through the series of air ejectors effectively overcomes the increased resistance to vapor transfer that occurs with higher salt concentrations in the feed water. This is particularly important for zero liquid discharge applications, where salt concentrations in later processing stages can reach near-saturation levels. The multiple ejector configuration also provides beneficial redundancy, as the system 300A can continue to operate even if one ejector becomes less efficient or requires maintenance, albeit at a reduced capacity. This operational resilience is valuable for continuous industrial processes where downtime is undesirable.

Figure 3B:
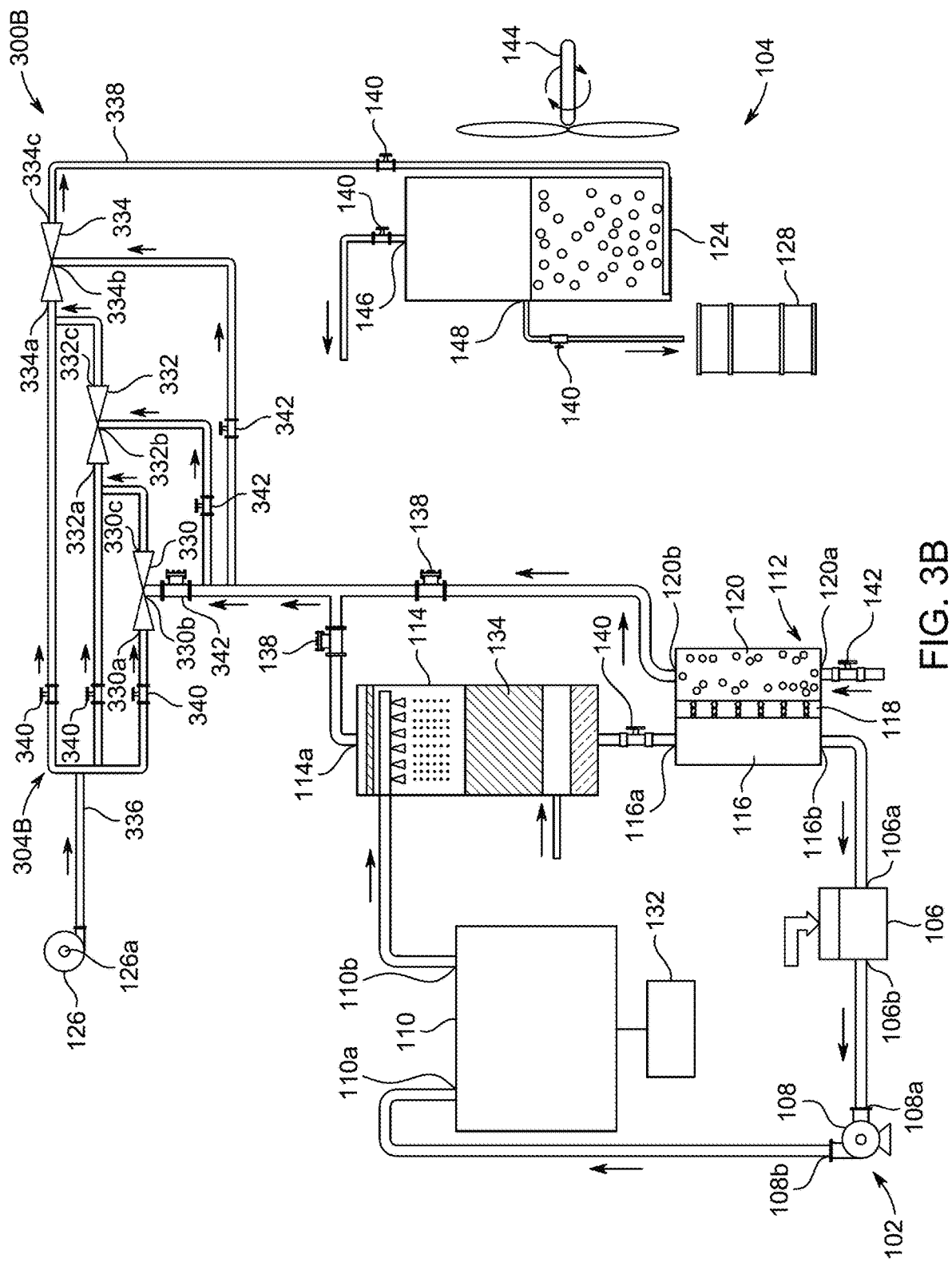
FIG. 3B is an exemplary schematic diagram of a system for water desalination utilizing multiple air ejectors, according to certain embodiments.

Referring to FIG. 3B, illustrated is an exemplary schematic diagram of a system for water desalination (represented by reference numeral 300B, and hereinafter referred to as "system 300B"), according to certain embodiments. The system 300B includes an ejector module 304B that incorporates three or more air ejectors 330, 332, 334 arranged in a parallel configuration for controlled vacuum generation. This arrangement differs from the serial configuration of the system 300A in that the air ejectors 330, 332, 334 operate in parallel rather than in sequence, with each ejector creating vacuum for a specific portion of the humidifier 114 and/or membrane distillation unit 112. The parallel configuration offers advantages in terms of vacuum control and system adaptability, making it suitable for applications where vacuum regulation is more important than achieving the highest possible vacuum levels.

In the system 300B, the air blower 126 supplies air to a main distribution line 336 that branches to direct the primary air flow to first inlets 330a, 332a, 334a of each air ejector 330, 332, 334. The humid air from the humidifier 114 and the permeate chamber 120 of the membrane distillation unit 112 is split into multiple streams that enter second inlets 330b, 332b, 334b of the respective air ejectors. Each air ejector 330, 332, 334 operates independently, creating vacuum at its second inlet and mixing the primary and secondary streams. The mixed streams exiting from outlets 330c, 332c, 334c of the air ejectors 330, 332, 334 converge into a common outlet line 338 that directs the combined flow to the bubble column dehumidifier 124. The system 300B incorporates flow control valves 340 positioned at strategic points in the air distribution network to regulate the flow rates to and from each air ejector 330, 332, 334, allowing for control of the vacuum levels created thereby. The system 300B also incorporates secondary flow control valves 342 at the second inlets 330b, 332b, 334b of each air ejector 330, 332, 334. These secondary flow control valves 342 regulate how much humid air flows into each air ejector 330, 332, 334, providing an additional level of control over the vacuum distribution. By adjusting these secondary flow control valves 342, operators can control the vapor extraction rates from different parts of the system 300B based on current process conditions.

The parallel arrangement of air ejectors in the system 300B offers several advantages over the serial configuration. The system 300B provides more control over the vacuum levels applied to different parts of the system 300B, as each ejector can be individually regulated through its associated flow control valves 340. This allows operators to create different vacuum levels for the humidifier 114 and the membrane distillation unit 112 based on their specific requirements, rather than applying a uniform vacuum level to both components. Also, the parallel configuration is more adaptable to varying operational conditions, as individual ejectors can be activated or deactivated as needed without affecting the entire system. For example, during periods of reduced production demand, one or more ejectors can be taken offline to save energy while maintaining adequate vacuum levels for continued operation. Further, the parallel arrangement facilitates maintenance activities, as individual ejectors can be serviced or replaced without shutting down the entire vacuum system.

Figure 4:
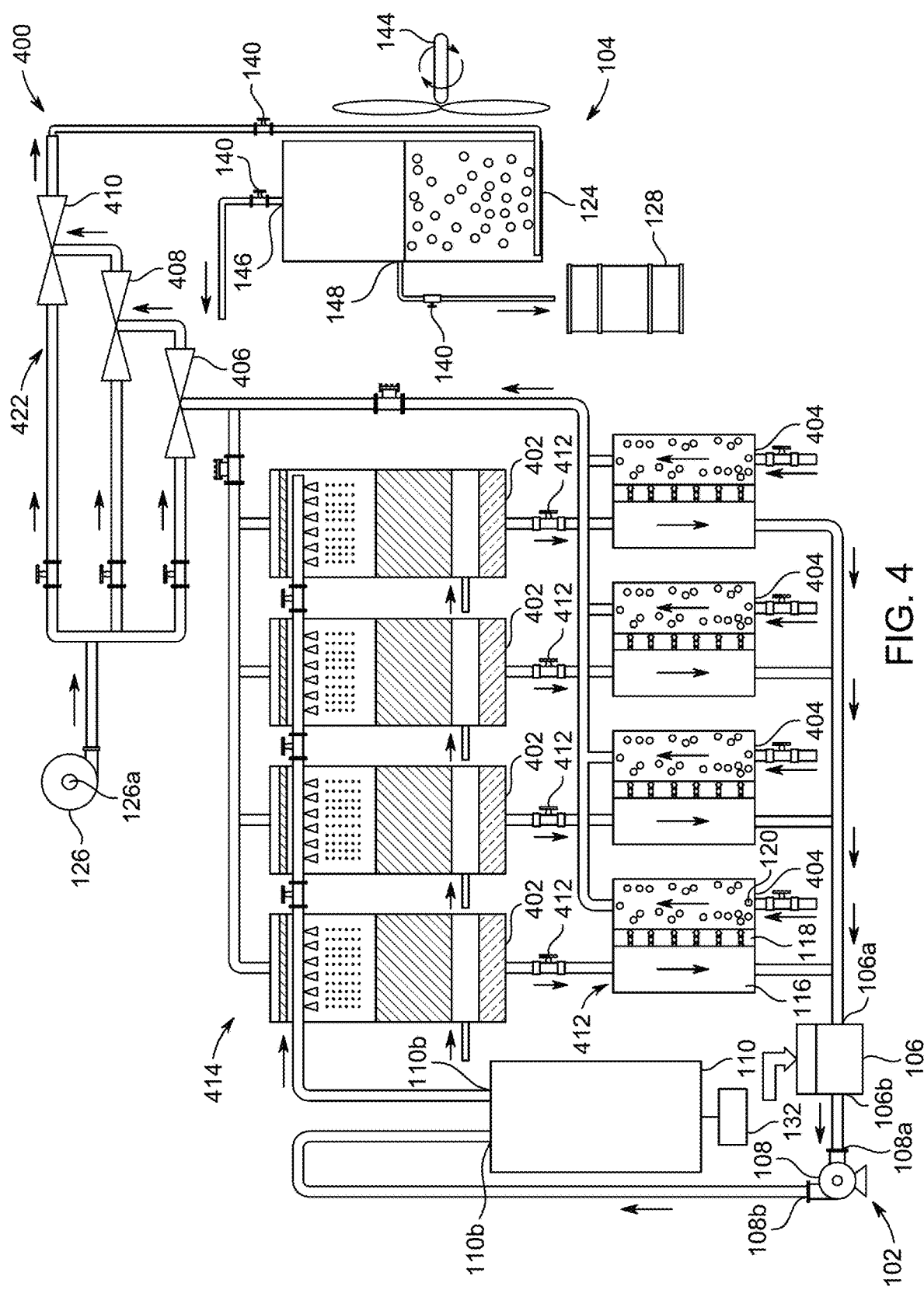
FIG. 4 is an exemplary schematic diagram of a system for water desalination utilizing multiple packed-bed humidifiers and sweeping gas membrane distillation systems with multiple air ejectors and a single-stage bubble column dehumidifier, according to certain embodiments.

Referring to FIG. 4, illustrated is an exemplary schematic diagram of a system for water desalination (represented by reference numeral 400, and hereinafter referred to as "system 400"), according to certain embodiments. Herein, the membrane distillation unit is a multi-stage membrane distillation unit 412. Also, the humidifier is a multi-stage humidifier 414. Further, the ejector is a multi-stage ejector 422. The system 400 employs a parallel arrangement of multiple desalination modules, each including a packed-bed humidifier 402 and a sweeping gas membrane distillation (SGMD) unit 404. This parallel configuration is designed to handle larger volumes of saline feed water, enabling higher freshwater production rates compared to single-module systems. The system 400 is connected to multiple air ejectors 406, 408, 410 and the single-stage bubble column dehumidifier 124. This configuration demonstrates adaptability and scalability of the system 400 for various operational needs, particularly in industrial settings where high throughput is required. The parallel arrangement allows for independent operation of each desalination module, providing flexibility in managing maintenance and operational adjustments without affecting output of the entire system.

The system 400 incorporates a modular design with each desalination module including the packed-bed humidifier 402 and the SGMD unit 404 operating in parallel. Hot saline water, preheated by the heater 110, enters each humidifier stage 402 at the same temperature. This parallel feed can promote uniform processing conditions across all modules. Within each humidifier 402, the hot saline water is sprayed or distributed over a packing material, increasing the contact area between the water and the air stream. The air, drawn in by the vacuum created by the air ejectors, flows countercurrently to the water, becoming humidified and carrying water vapor. The partially concentrated saline water exiting each humidifier 402 then feeds into the corresponding SGMD unit 404.

In each SGMD unit 404, further desalination occurs via the hydrophobic microporous membrane 118. The vacuum created by the air ejectors, and specifically applied to the permeate chamber 120 of each SGMD unit, enhances vapor transport across the membrane. The sweeping gas, which can be atmospheric air in an open-cycle configuration or recirculated air in a closed-cycle configuration, carries the permeated water vapor away from the membrane surface. The concentrated brine exiting each SGMD unit 404 is cycled back to the feed tank 106 and heater 110, where it is reheated before being fed back into the humidifier stages to continue the process. This recirculation loop reduces water waste and improves the overall thermal efficiency of the system 400. The humid air streams from both the humidifiers 402 and the SGMD units 404 are combined and directed to the series of air ejectors 406, 408, 410, which boost the airflow and create the necessary vacuum for the system operation. The combined humid air stream then enters the bubble column dehumidifier 124, where the water vapor is condensed to produce fresh water.

The system 400 also includes flow control valves 412 positioned between each humidifier stage 402 and SGMD units 404. These valves allow for control of the saline water flow rate to each component. This control allows for improving the performance of each module and for adapting to varying feed water conditions or production demands. For instance, if the salinity of the feed water increases, the flow rates can be adjusted to control vapor extraction rates. Furthermore, the modular design allows for individual modules to be disconnected if necessary, for maintenance or repair, without shutting down the entire system. This modularity and the use of flow control valves contribute to operational flexibility of the system. The collected fresh water is sent to a storage unit.

Figure 5A:
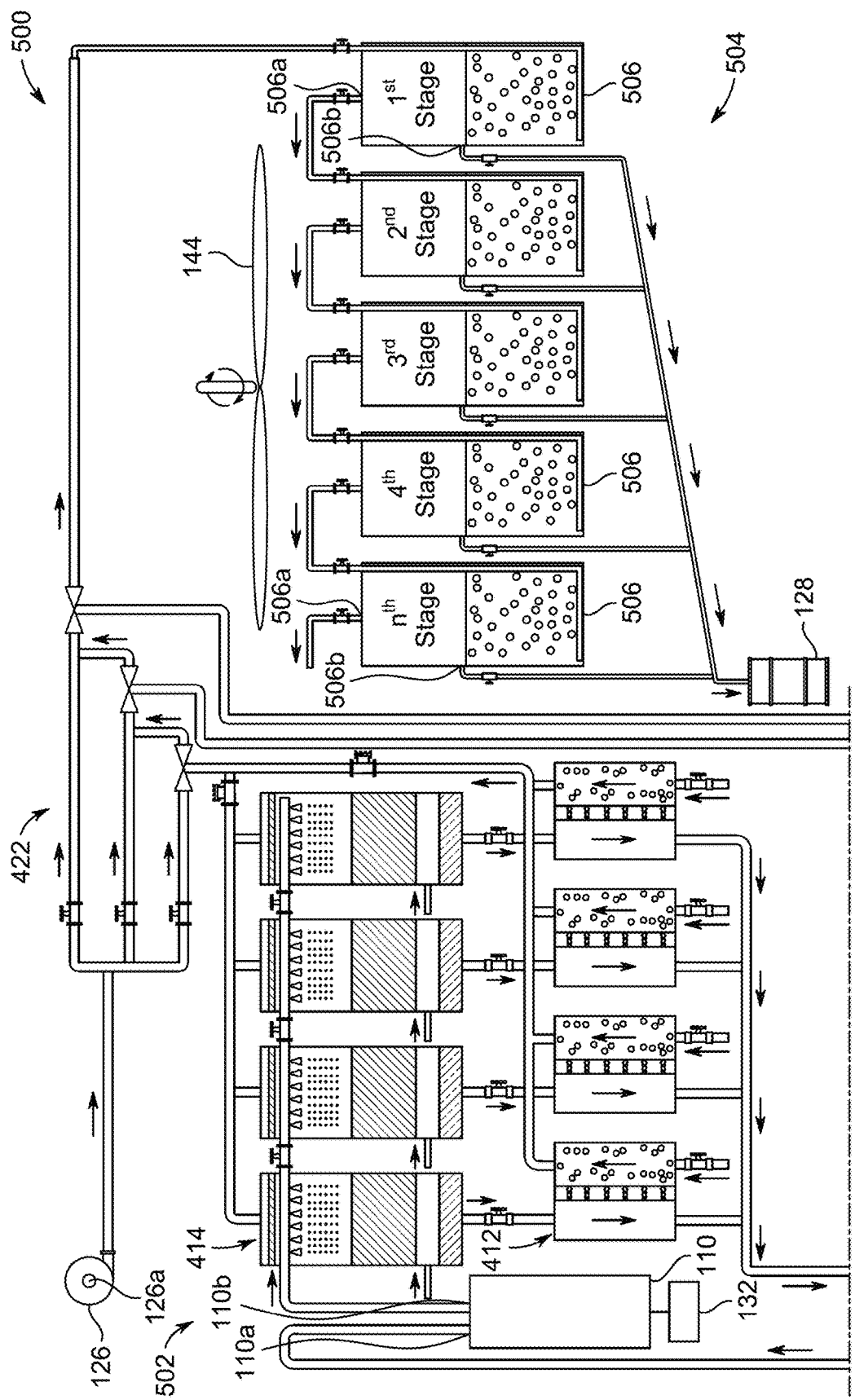
FIGS. 5A, 5B and 5C show parts of a system for water desalination utilizing multiple desalination modules and multiple dehumidifiers, according to certain embodiments.
Figure 5B:
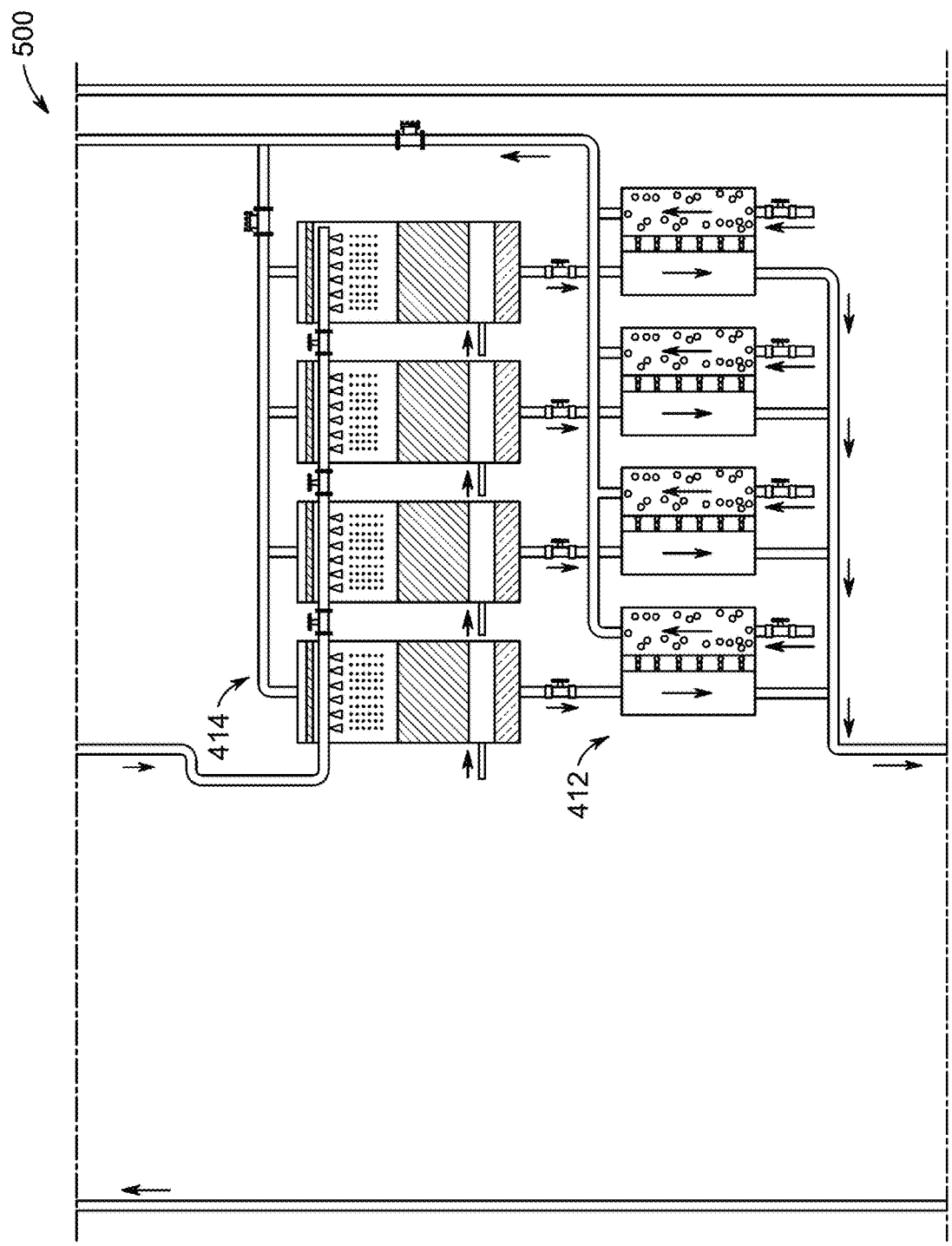
Figure 5C:
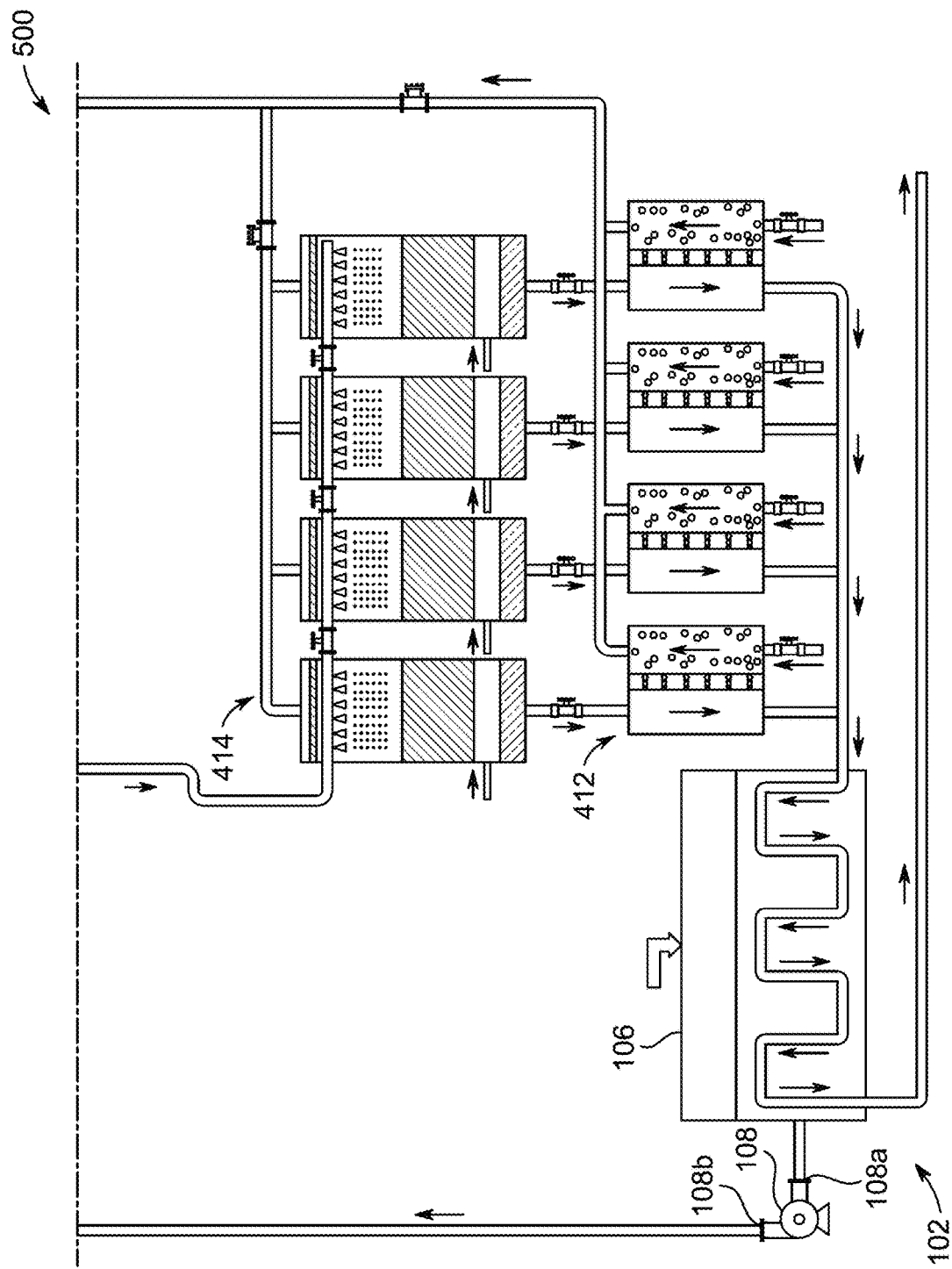

Referring to FIGS. 5A, 5B and 5C, illustrated is an exemplary schematic diagram of a system for water desalination (represented by reference numeral 500, and hereinafter referred to as "system 500"), according to certain embodiments. The system 500 employs a parallel connection of multiple desalination modules 502, each including the multi-stage membrane distillation unit 412 and the multi-stage humidifier 414 (as discussed in reference to FIG. 4). This configuration can be particularly suited for applications requiring high freshwater production capacity and operational flexibility. The system 500 includes a multi-stage bubble column dehumidifier 504. One feature of the system 500 is the modularity, highlighting how multiple desalination modules 502 can be connected in parallel to scale up capacity of the system 500. Each desalination module 502 operates independently, allowing for individual control and maintenance.

In particular, each desalination module 502 in the system 500 receives hot saline feed water from a common header or distribution system. The feed water first enters the packed-bed humidifier, where it interacts with a counter-current flow of air, becoming partially concentrated as water vapor transfers to the air stream. The partially concentrated water then flows to the SGMD unit, where further desalination occurs via the hydrophobic microporous membrane. The vacuum created by an ejector system (same as the multi-stage ejector 422 of the system 400) enhances vapor transport across the membrane. The sweeping gas carries the permeated water vapor away, and the concentrated brine is either recirculated or directed to a brine management system.

Further, in the system 500, the feed tank 106 is configured to receive and manage the concentrated brine exiting the SGMD units. This configuration is particularly relevant when the system 500 is used for brine mining or zero-liquid discharge applications. The feed tank 106 may include features for separating solids or further concentrating the brine. The output from the feed tank 106, in this case, is directed towards brine mining operations, rather than being recirculated for further desalination.

The system 500 can be integrated with various types of ejector systems (air or water, single or multi-stage) and BCD configurations (single or multi-stage) depending on the specific application requirements. In the illustrated example, the system 500 includes the multi-stage bubble column dehumidifier 504 that includes n number of stages, where n is an integer from 1 to 100 e.g. 1, 2, 3, 5, 10, 20, 50 75, 100 or any integers therebetween. Each stage includes a bubble column 506. A first stage is operationally connected to an outlet of the air ejector to receive the mixed stream and is configured to capture a portion of the water vapor in the mixed stream to form desalinated water. Each bubble column 506 includes a vapor outlet 506a through which a portion of the water vapor that is not captured in one stage is configured to pass to a next stage. Each bubble column 506 also includes a desalinated water outlet 506b operationally connected to the desalinated water tank to collect the desalinated water. It may be contemplated that a vapor outlet 506a of a bubble column 506 of a final stage of the multi-stage bubble column dehumidifier 504 is operationally connected to the inlet of the air blower 126 in case of closed air cycle configuration of the system 500. In each stage, a portion of the water vapor present in the humid air condenses and is collected as desalinated water. The remaining air, with reduced humidity, then proceeds to the next stage for further dehumidification. This sequential arrangement of multiple stages in the multi-stage bubble column dehumidifier 504 enables more thorough extraction of water vapor compared to a single-stage configuration. The gradual reduction in humidity and temperature as the air travels through successive stages enhances the overall efficiency of water vapor condensation and collection.

The modular design of the system 500 offers significant advantages for scalability and operational flexibility. To increase the freshwater production capacity, additional modules 502 can be added to the parallel arrangement without requiring major modifications to the existing infrastructure. This scalability allows for adapting to changing water demands or for expanding capacity of the system over time. Furthermore, the independent operation of each desalination module 502 allows for individual maintenance and repair without affecting the overall output of the system 500. That is, if one module 502 requires servicing, it can be taken offline while the remaining modules 502 continue to operate. This redundancy enhances reliability and reduces downtime of the system 500.

Figure 6:
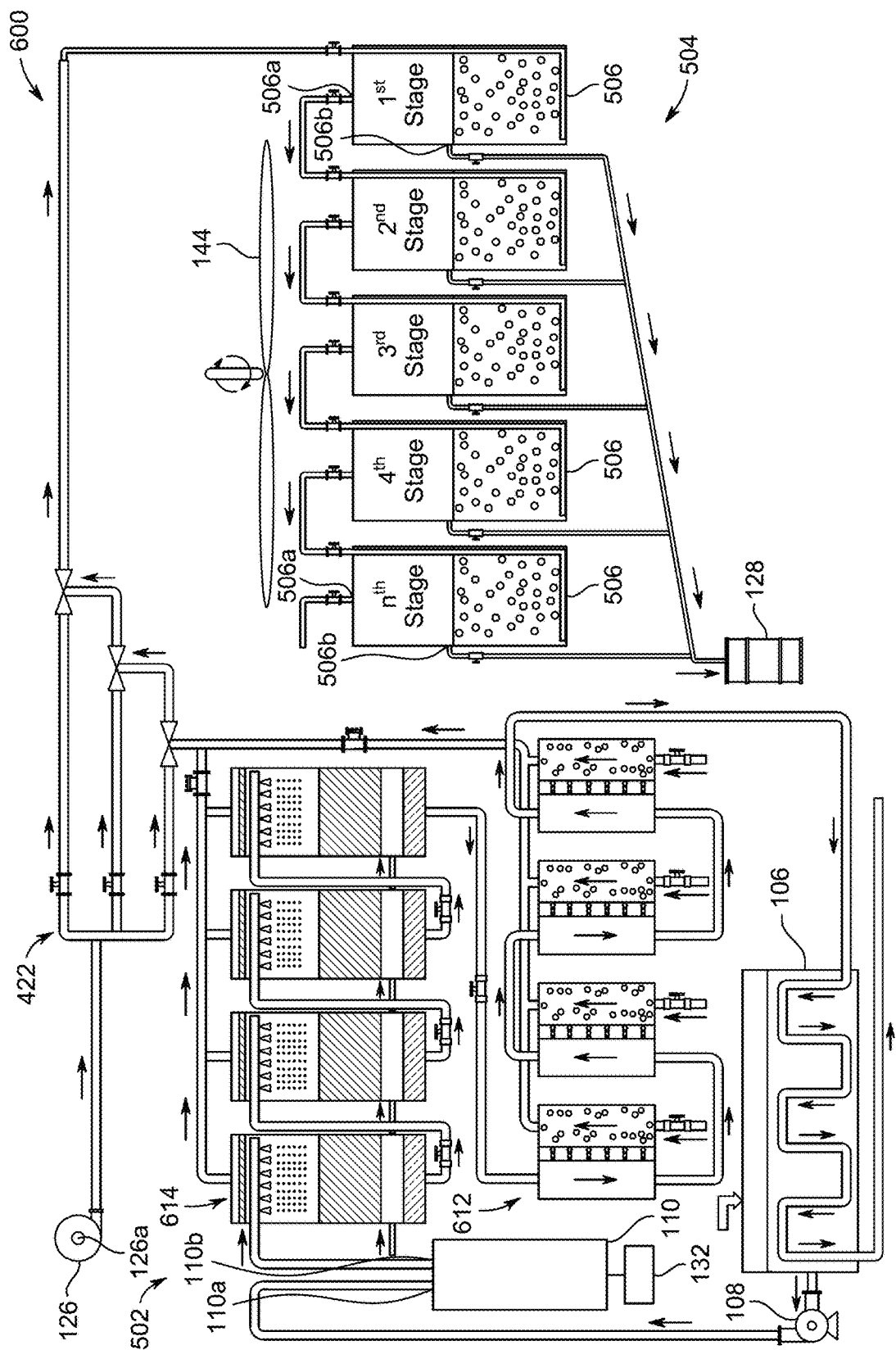
FIG. 6 is an exemplary schematic diagram of a system for water desalination utilizing multiple humidifiers with multiple sweeping gas membrane distillation systems, arranged in a serial manner, according to certain embodiments.

Referring to FIG. 6, illustrated is an exemplary schematic diagram of a system for water desalination (represented by reference numeral 600, and hereinafter referred to as "system 600"), according to certain embodiments. The system 600 employs a multistage humidifier 614 with multiple packed-bed humidifiers arranged in series with each other, integrated with a multi-stage membrane distillation unit 612 with multiple SGMD arranged in series with each other. The serial configuration can be particularly well-suited for applications requiring progressive concentration of the feed water, such as zero-liquid discharge (ZLD) systems and brine mining operations. The system 600 demonstrates a layout, with the feed water flowing sequentially through the humidifier stages and then through the SGMD stages. This sequential flow path allows for gradual increases in salinity and facilitates control over the brine concentration.

In the system 600, hot saline feed water first enters the first stage of the multistage humidifier 614. As the water flows through each subsequent humidifier stage, it becomes progressively more concentrated as water vapor is transferred to the air stream. The air, flowing counter-currently to the water, also becomes progressively more humidified as it passes through the humidifier stages. After exiting the final humidifier stage, the concentrated saline water enters the first stage of the multi-stage membrane distillation unit 612. The water then flows sequentially through each SGMD stage, with further water vapor extraction occurring at each stage due to the vacuum-assisted membrane distillation process. The rejected brine from the fourth SGMD stage can be directed to a brine management system or used to preheat the incoming feed water if the temperature difference is favorable.

The serial arrangement of both the multi-stage humidifier 614 and the multi-stage membrane distillation unit 612 allows for a gradual and controlled increase in the salinity of the feed water, as may be required for achieving high levels of concentration without causing membrane fouling or scaling. This serial configuration also enhances the utilization of thermal energy, as the heat from the initial stages is partially recovered in subsequent stages. The series arrangement further simplifies the control system, as the flow rates and vacuum levels can be adjusted progressively along the flow path. The system 600 may incorporate flow control valves between stages to regulate the flow of water and air, allowing for fine-tuning of the process parameters. The system 600 can be adapted to different feed water salinities and desired final brine concentrations by adjusting the number of stages in both the humidifier and the SGMD system.

Figure 7:
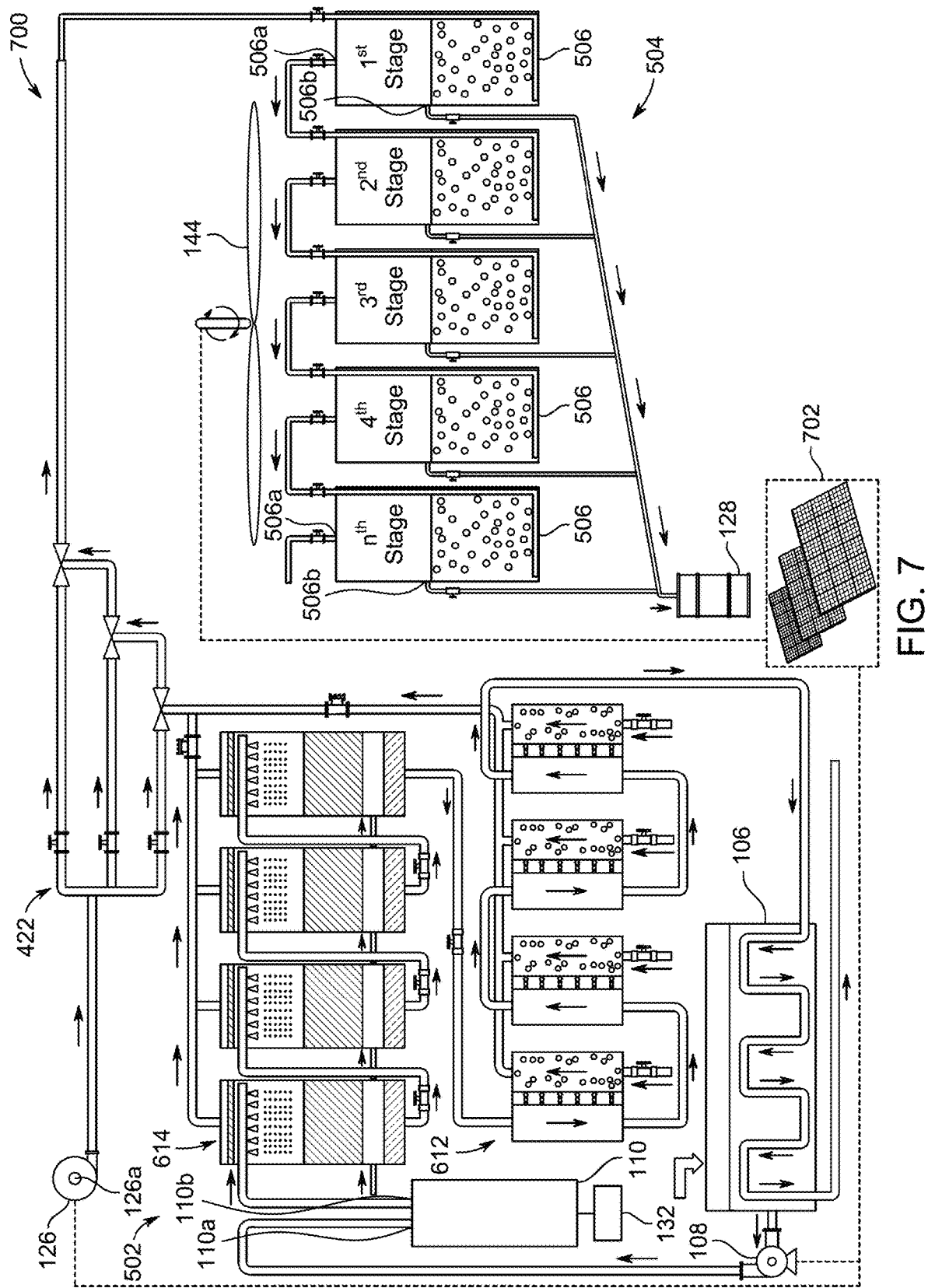
FIG. 7 is an exemplary schematic diagram of a system for water desalination utilizing renewable energy from photovoltaic panels, according to certain embodiments.

Referring to FIG. 7, illustrated is an exemplary schematic diagram of a system for water desalination (represented by reference numeral 700, and hereinafter referred to as "system 700"), according to certain embodiments. The system 700 utilizes the integration of renewable energy, specifically photovoltaic (PV) panels 702, to power its components. This integration demonstrates potential of the system 700 for sustainable operation, reducing reliance on conventional energy sources and reducing its environmental footprint. The system 700 can incorporate any of the previously described configurations (e.g., single or multi-stage, serial or parallel arrangements of humidifiers and MD units), as the use of renewable energy is independent of the specific desalination process arrangement. One feature of the system 700 is the utilization of photovoltaic (PV) panels 702 to provide power to the various electrical components thereof.

The PV panels 702, typically arranged as an array, convert solar energy into electrical energy, which is then used to power the air blower 126, the water circulation pump(s) 108, and potentially other components such as control valves and fans (if present). The use of PV panels 702 aligns with the growing emphasis on sustainable and environmentally friendly technologies. By utilizing solar energy, the system 700 reduces its operating costs associated with electricity consumption and contributes to a lower carbon footprint. The size and capacity of the array of the PV panels 702 can be tailored to the specific energy requirements of the system 700, considering factors such as the size of the desalination plant, the operating hours, and the local solar irradiance. The system 700 may also incorporate a battery storage system (not shown in FIG. 7) to store excess energy generated during peak sunlight hours for use during periods of low or no sunlight. This energy storage capability enhances reliability of the system 700 and allows for continuous operation even in the absence of direct sunlight.

Figure 8A:
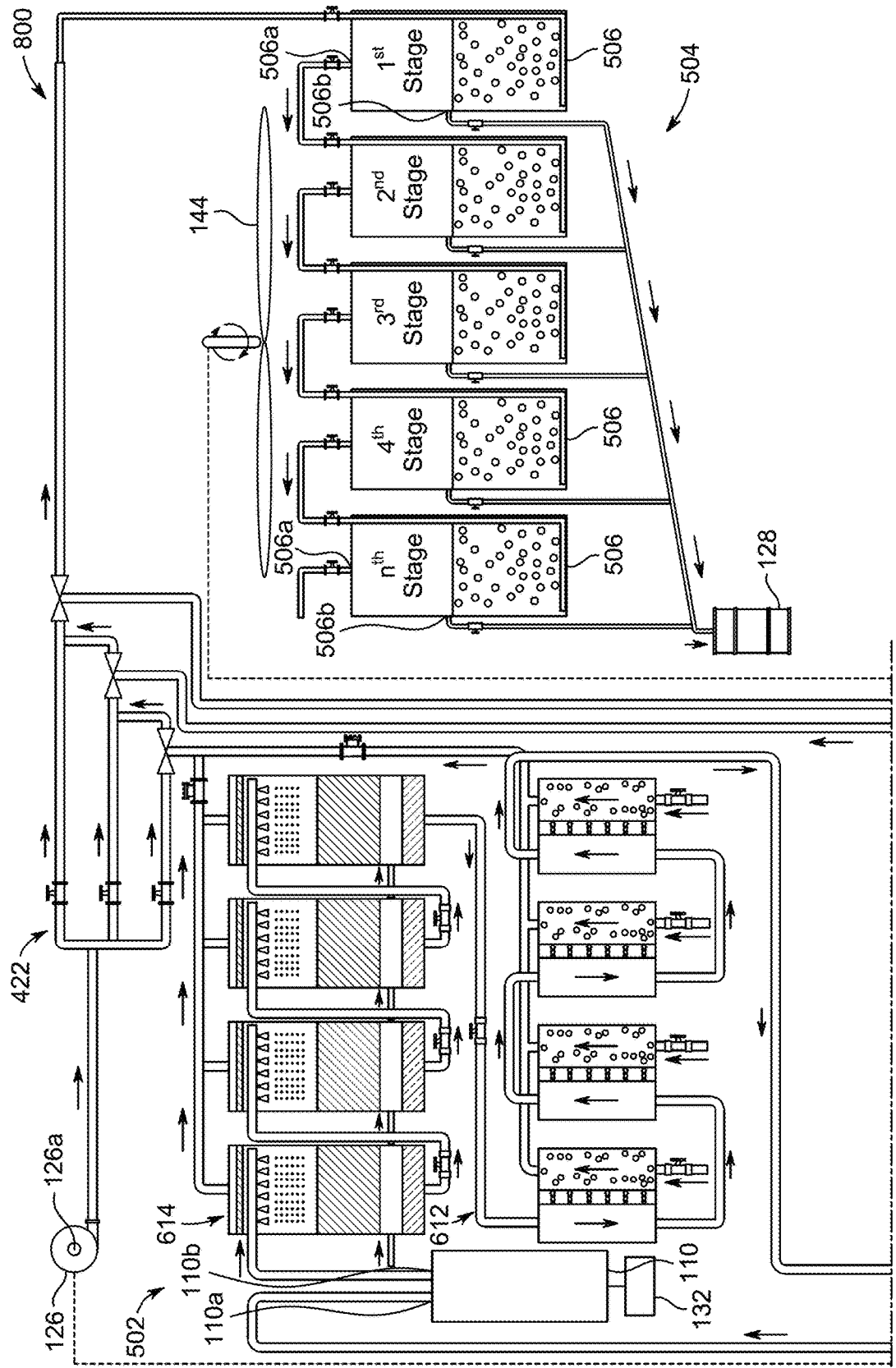
FIGS. 8A, 8B and 8C show parts of a system for water desalination utilizing a serial feed stream configuration, according to certain embodiments.
Figure 8B:
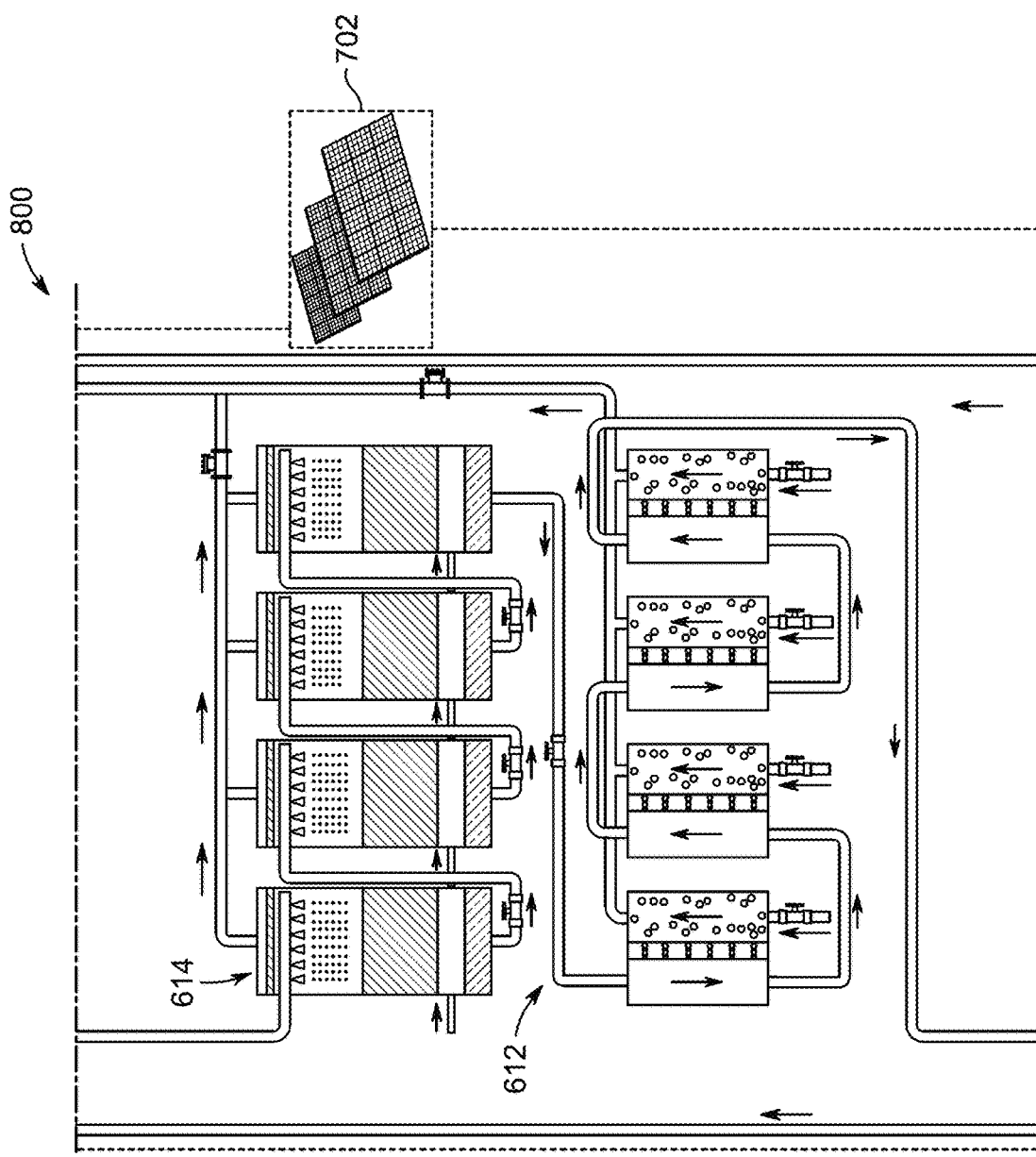
Figure 8C:
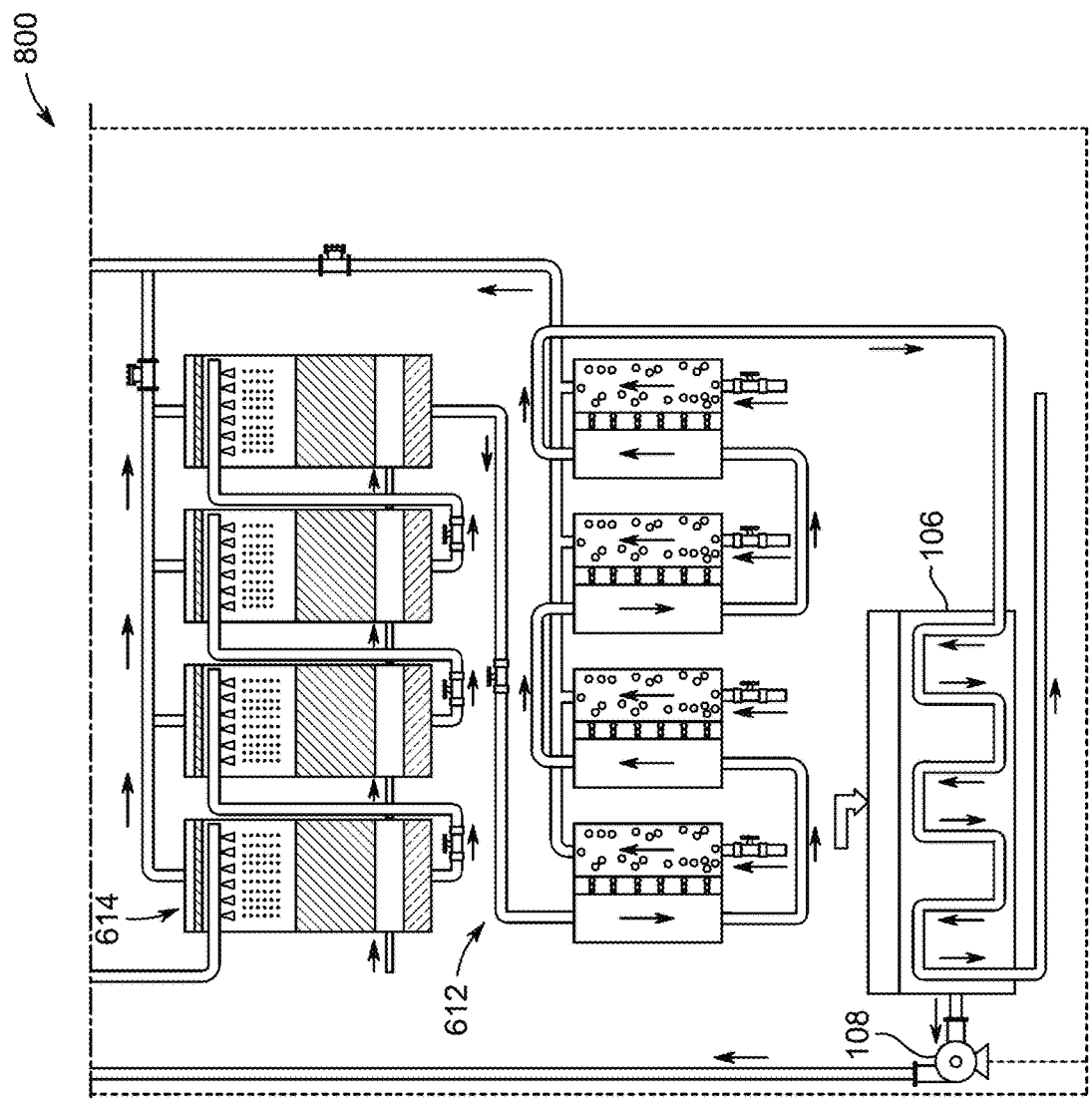

Referring to FIGS. 8A, 8B and 8C, illustrated is an exemplary schematic diagram of a system for water desalination (represented by reference numeral 800, and hereinafter referred to as "system 800"), according to certain embodiments. The system 800 can be configured for a serial feed stream arrangement, similar to the system 600 in FIG. 6, and with a modular arrangement (as in the system 500 of FIGS. 5A, 5B and 5C) and incorporates the array of the PV panels 702. This modularity allows for easy scalability and adaptation to different operational requirements, making the system 800 suitable for a wide range of applications, including zero-liquid discharge (ZLD) and brine mining. The system 800 features multiple desalination modules connected in series, with each module including a packed-bed humidifier and a sweeping gas membrane distillation (SGMD) unit. The system 800 provides the serial flow path and the modular construction to handle progressively increasing salinity levels.

In the system 800, hot saline feed water enters the first desalination module, passing first through the packed-bed humidifier and then through the SGMD unit. As the water flows through each subsequent module, it becomes progressively more concentrated as water vapor is extracted. The air stream, flowing counter-currently to the water in the humidifiers, also becomes progressively more humidified. The brine exiting the fourth SGMD unit can be directed to a brine management system or used for resource recovery in brine mining applications. The modular design of the system 800 allows for easy expansion or contraction of its capacity. To increase the freshwater production rate or to achieve higher levels of brine concentration, additional modules can be added to the serial arrangement. Conversely, modules can be removed or bypassed if lower capacity is required. This flexibility allows for adapting to changing water demands or for improving performance of the system 800 based on feed water characteristics. The system 800 is particularly well-suited for ZLD applications, where the goal is to eliminate all liquid discharge from the desalination process. The serial arrangement allows for progressive concentration of the feed water until a near-solid or highly concentrated brine is produced. This concentrated brine can then be further processed for resource recovery, such as the extraction of valuable minerals.

Figure 9:
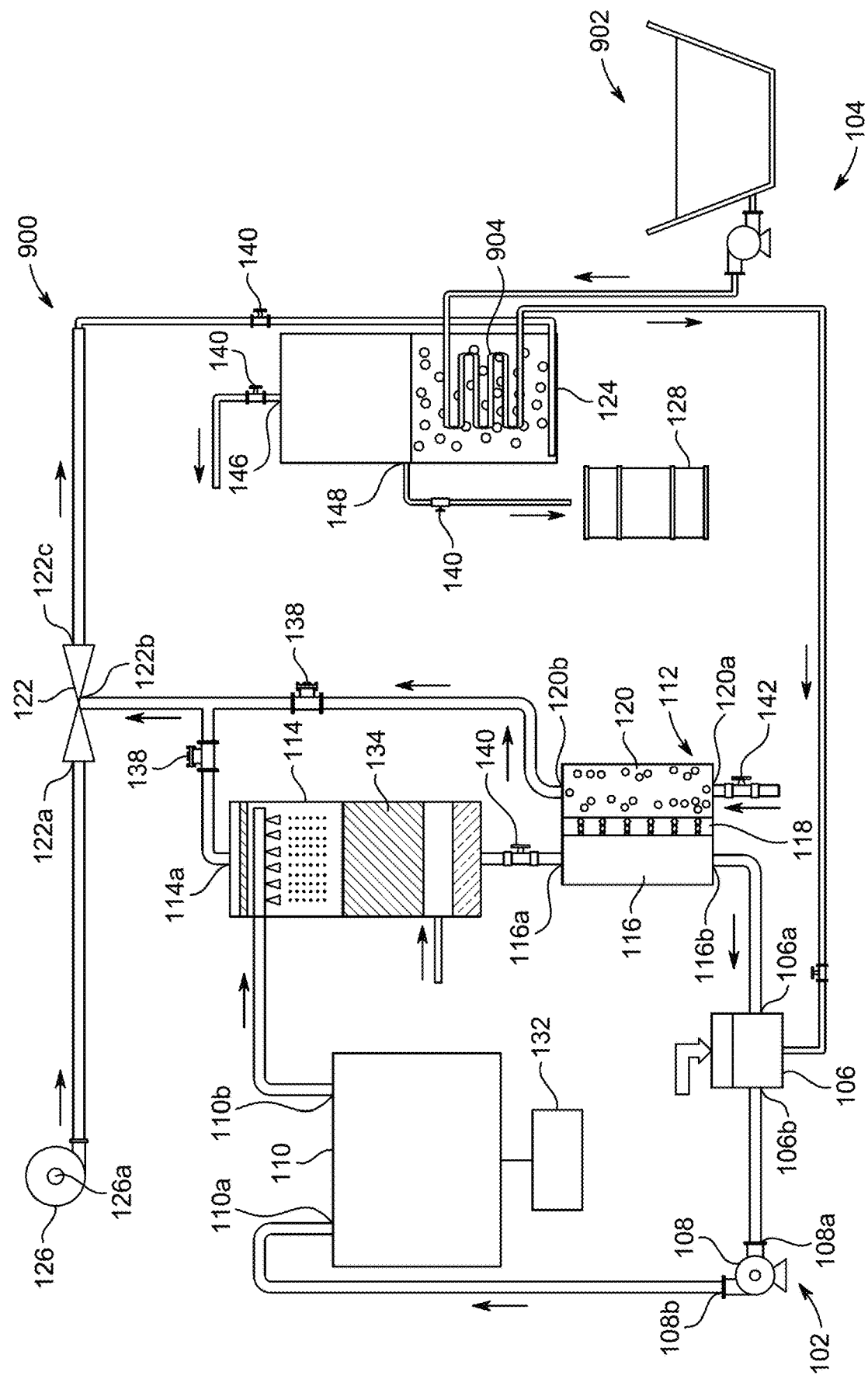
FIG. 9 is an exemplary schematic diagram of a system for water desalination utilizing heat recovery using feed makeup stream, according to certain embodiments.

Referring to FIG. 9, illustrated is an exemplary schematic diagram of a system for water desalination (represented by reference numeral 900, and hereinafter referred to as "system 900"), according to certain embodiments. The system 900 incorporates a heat recovery unit 902 that utilizes the feed makeup stream to cool the bubble column dehumidifier (BCD) 124 and preheat the feed water. This heat recovery significantly improves overall energy efficiency of the system 900 by reducing the amount of external energy required to heat the feed water to the desired operating temperature. The system 900 can be based on any of the previously described configurations (single or multi-stage, series or parallel), as the heat recovery mechanism is applicable regardless of the specific arrangement of the desalination components.

In the system 900, the feed makeup water, which is typically sourced from the sea or a large reservoir at ambient temperature, is used as a cooling medium for the BCD 124. As the humid air from the ejector (either air or water) enters the BCD 124, it cools and condenses, releasing its latent heat of vaporization. This heat is absorbed by the water column within the BCD 124, causing its temperature to rise. Instead of dissipating this heat to the environment, the system 900 directs the feed makeup water through a heat exchanger 904 within or associated with the BCD 124. The warm water in the BCD 124 transfers its heat to the cooler feed makeup water, raising the temperature of the makeup water before it enters the feed tank 106. This preheating of the feed makeup water reduces the energy load on the main heater 110, as the water entering the heater is already at a higher temperature than it would be without heat recovery.

The heat recovery unit 902 in the system 900 provides significant energy savings, particularly in large-scale desalination plants. By utilizing the waste heat from the BCD 124, the system 900 reduces its overall energy consumption and operating costs. The effectiveness of the heat recovery depends on the temperature difference between the BCD water and the feed makeup water, as well as the efficiency of the heat exchanger 904. The heat recovery unit 902 may incorporate temperature sensors and control valves to improves the heat exchange process and ensure that the feed makeup water is preheated to the desired temperature. In the system 900, the heat recovery improves energy efficiency as well as enhances the sustainability of the desalination process by reducing thermal discharge to the environment.

Figure 10A:
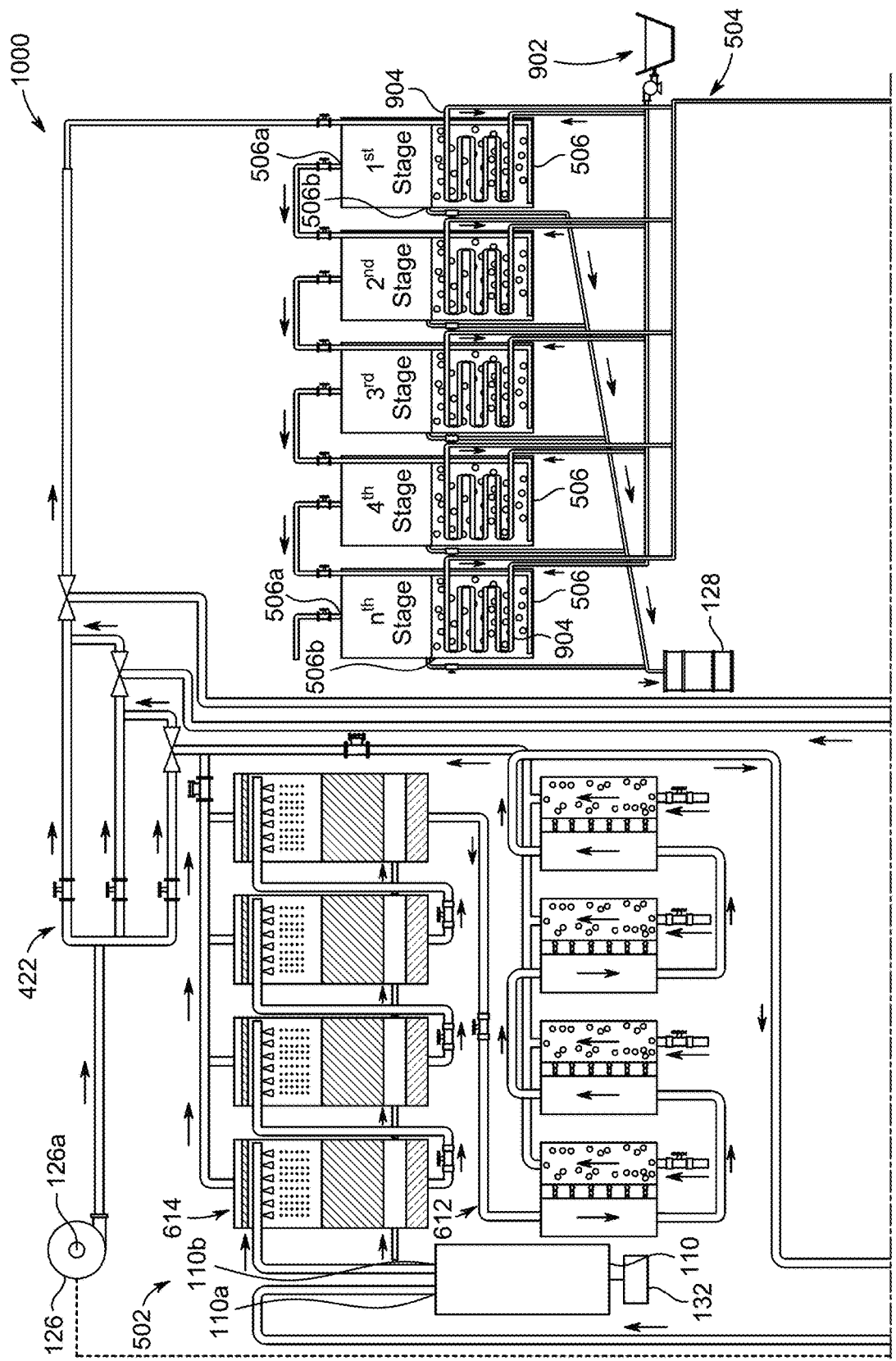
Figure 10B:
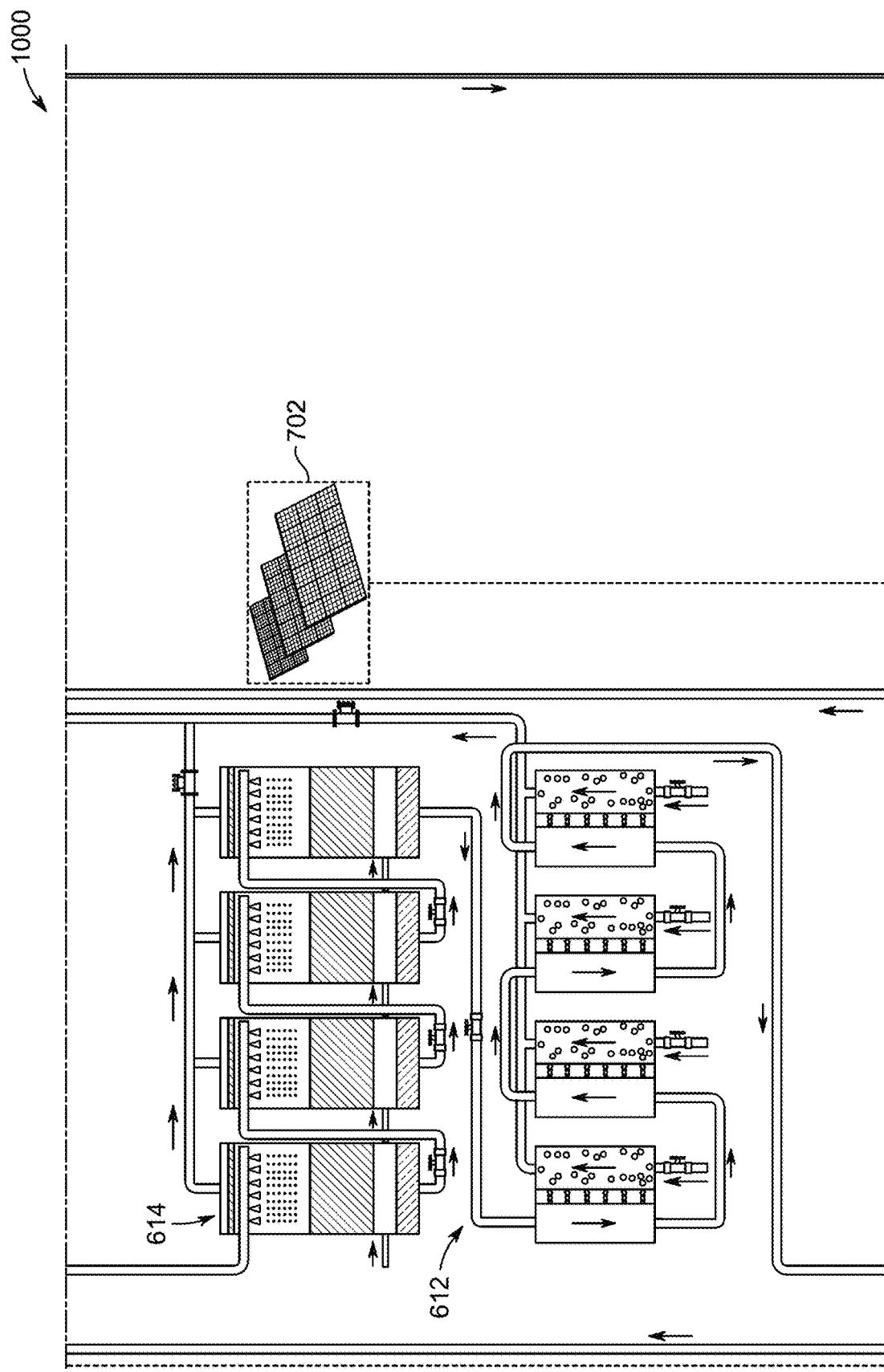

Referring to FIGS. 10A, 10B and 10C, illustrated is an exemplary schematic diagram of a system for water desalination (represented by reference numeral 1000, and hereinafter referred to as "system 1000"), according to certain embodiments. The system 1000 combines the features of the modular design (as seen in FIGS. 8A, 8B and 8C) with the heat recovery unit 902 (as seen in FIG. 9). This combination results in a highly efficient and scalable system suitable for various applications, including those requiring high salinity treatment and zero-liquid discharge. The system 1000 features multiple desalination modules connected in series, each module including a packed-bed humidifier and a sweeping gas membrane distillation (SGMD) unit. The feed makeup stream is used for heat recovery, cooling the bubble column dehumidifier (BCD) stages and preheating the feed water.

In the system 1000, hot saline feed water progresses through the series of desalination modules. Within each module, the water first passes through the packed-bed humidifier, where it is partially concentrated, and then through the SGMD unit, where further water vapor is extracted. The air stream flows counter-currently to the water in the humidifiers, becoming progressively more humidified. The modular design allows for easy scaling of the system 1000 by adding or removing modules as needed.

This adaptability allows for meeting changing water demands or improving performance of the system 1000 based on feed water characteristics. The serial arrangement can be well-suited for achieving high levels of brine concentration, making the system 1000 applicable to zero-liquid discharge and brine mining operations.

The heat recovery unit 902 in the system 1000 significantly improves energy efficiency. The feed makeup water, typically sourced from the sea or a reservoir, is used to cool the multiple stages of the BCD. As humid air cools and condenses in each BCD stage, the released heat is absorbed by the feed makeup water. This warmed makeup water is then directed to the feed tank 106, reducing the energy required by the heater 110. The cooling of the BCD stages using the feed makeup water can be arranged in parallel (as shown in FIGS. 10A, 10B and 10C) or in series, where a single stream flows from one BCD stage to another for progressive heating. The parallel arrangement provides more uniform cooling across the BCD stages, while the serial arrangement improves the temperature increase of the makeup water. The choice between parallel and series cooling depends on the specific application requirements and the desired temperature profile.

Figure 11:
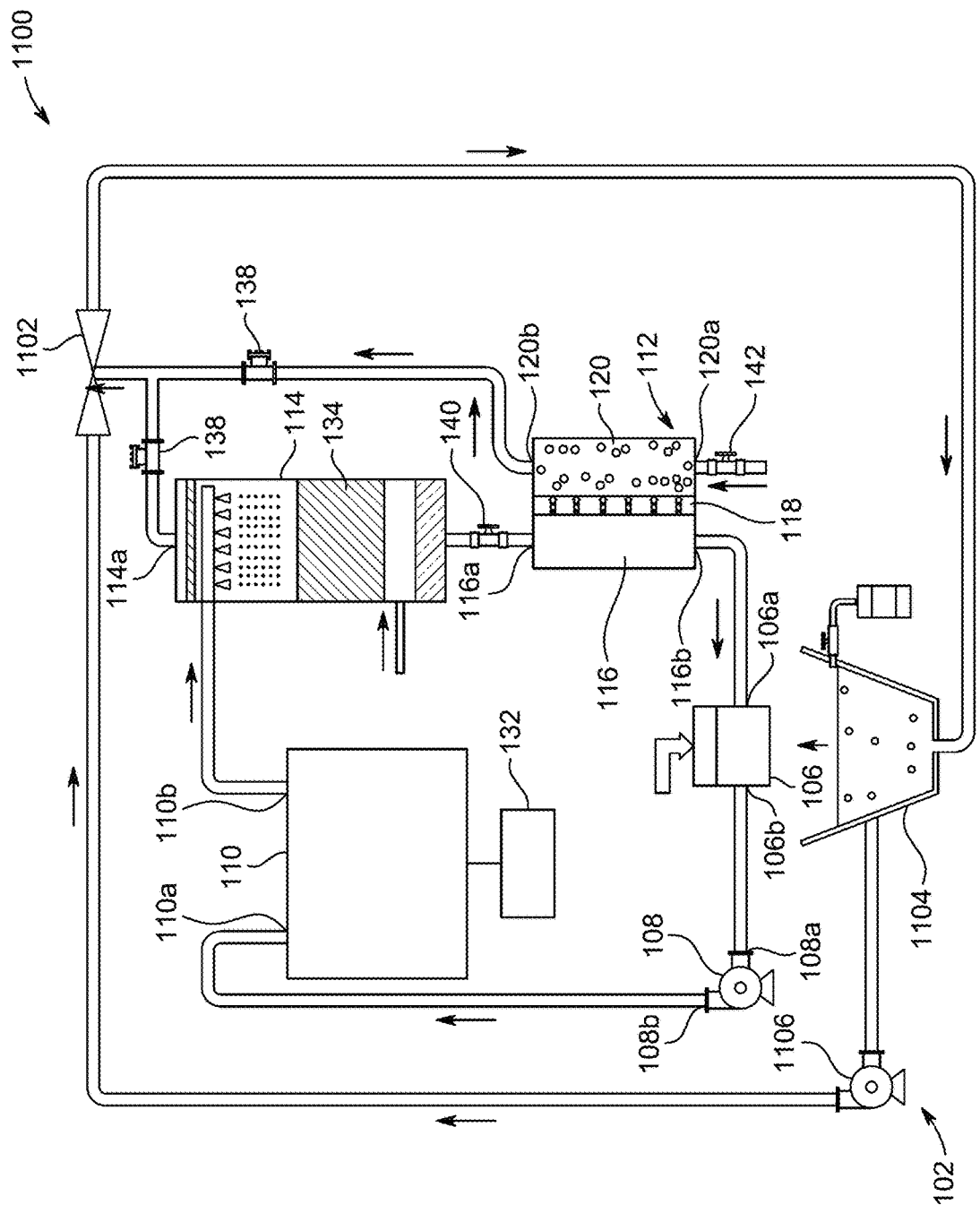
FIG. 11 is an exemplary schematic diagram of a system for water desalination utilizing a water ejector for higher levels of vacuum, according to certain embodiments.

Referring to FIG. 11, illustrated is an exemplary schematic diagram of a system for water desalination (represented by reference numeral 1100, and hereinafter referred to as "system 1100"), according to certain embodiments. The system 1100 utilizes a water ejector 1102 for creating the vacuum required for the desalination process, instead of the air ejectors used in previous embodiments. This configuration is particularly advantageous for achieving higher vacuum levels, which can enhance both the humidification and membrane distillation processes. The system 1100 incorporates the membrane module with the feed tank 106, the water circulation pump 108, the heater 110, the humidifier 114, and the membrane distillation unit 112. The ejector module includes the water ejector 1102 and an open water reservoir 1104.

In the system 1100, the water ejector 1102 uses water such as a high-velocity stream of water as its primary fluid, unlike the air ejectors which use air. This water stream is typically sourced from the fresh water produced by the system and recirculated through the ejector 1102. The high-velocity water stream creates a vacuum at the second inlet of the ejector 1102, which is connected to both the humidifier 114 and the permeate chamber 120 of the membrane distillation unit 112. This vacuum draws in the humid air from both the humidifier 114 and the MD unit 112. The vapor condensation (air dehumidification process) takes place immediately when the humid air mixes with the ejector water. After the ejector 1102, the stream containing water and air is directed to the open water reservoir 1104.

Herein, the water reservoir 1104 recirculates the water to the water ejector 1102, removes air from the water (deaeration), cools the water to enhance vapor condensation, and provides an easy mechanism for collecting the freshwater product. A variable speed pump 1106 regulates the flow of water from the water reservoir 1104 to the water ejector 1102, adapting to the vacuum needs and maintaining efficient operation of the system 1100. The use of the water ejector 1102 generally allows for the creation of a stronger vacuum compared to an air ejector, which can lead to higher vapor extraction rates in both the humidifier and the MD unit. This is particularly beneficial when dealing with high-salinity feed water, where a stronger driving force is needed to overcome the increased resistance to vapor transfer. The system 1100 separates the freshwater loop (water ejector and reservoir) from the saline feed water loop, preventing contamination of the product water.

Figure 12:
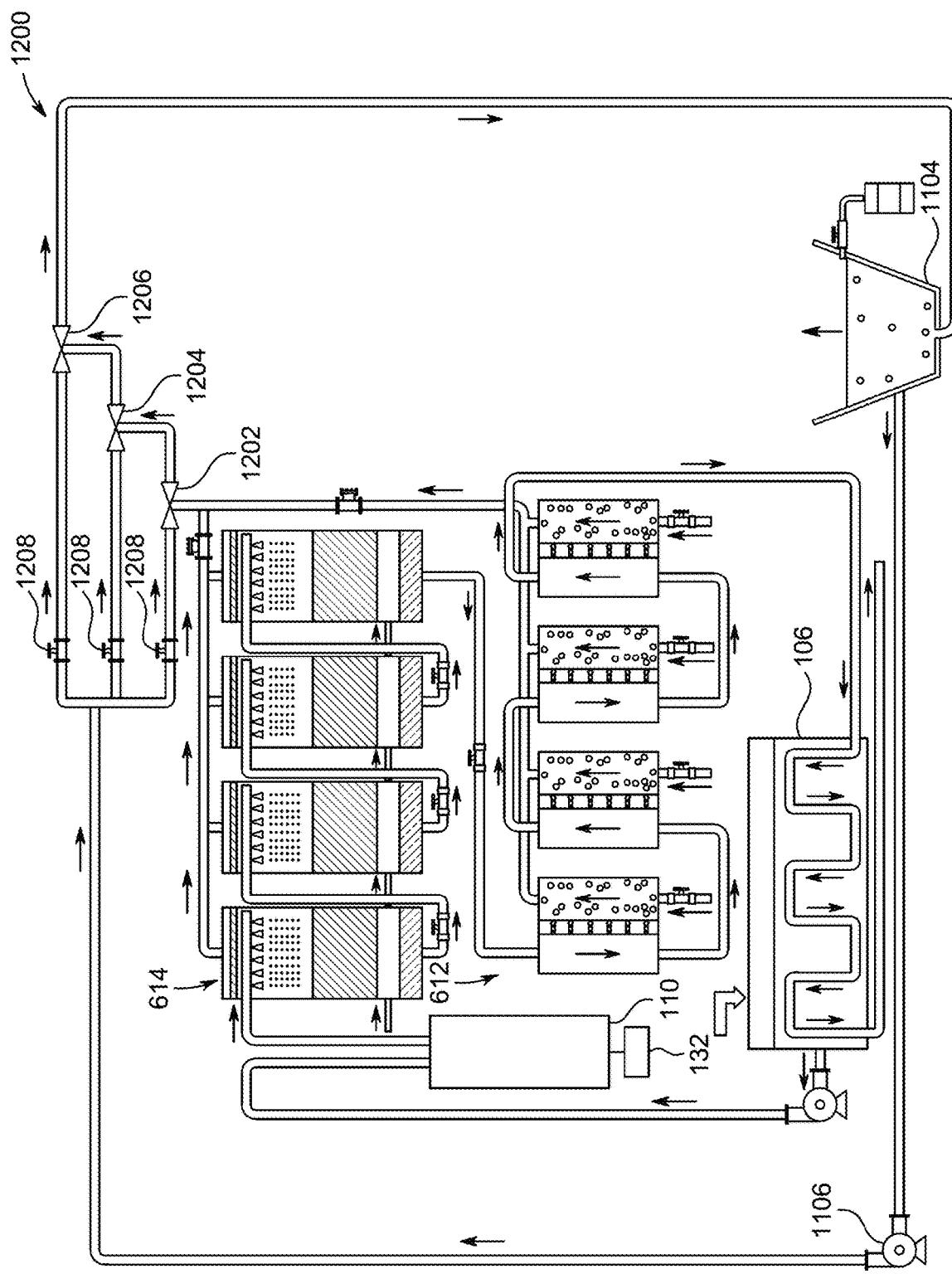
FIG. 12 is an exemplary schematic diagram of a system for water desalination utilizing multiple water ejectors for large-scale operations, according to certain embodiments.

Referring to FIG. 12, illustrated is an exemplary schematic diagram of a system for water desalination (represented by reference numeral 1200, and hereinafter referred to as "system 1200"), according to certain embodiments. The system 1200 includes multiple water ejectors 1202, 1204, 1206 connected in series, driving an integrated system of multistage packed-bed humidifiers and multistage sweeping air membrane distillation (SGMD) modules. This configuration is designed for large-scale operations requiring high freshwater production rates and efficient handling of high-salinity feed water. The use of multiple water ejectors in series allows for the generation of progressively stronger vacuum levels, enhancing the desalination process in both the humidifiers and the MD units.

In the system 1200, three or more water ejectors 1202, 1204, 1206 are connected in series, with flow control valves 1208 regulating the flow through them. This multi-ejector system provides a more reliable and stable vacuum compared to a single ejector setup. Each ejector operates at a different pressure, allowing for a more efficient and controlled extraction of humid air from the humidifier and SGMD units. The stronger vacuum achieved improves the productivity and efficiency of the desalination process by facilitating higher rates of vaporization in the humidifier and vapor permeation through the membrane of the MD unit. The design can be applied to various multistage configurations, including vertical or horizontal layouts, and parallel or serial arrangements of the humidifier and MD modules.

The multiple water ejector system in the system 1200 offers the flexibility to adjust the vacuum levels by controlling the respective primary stream flow through each ejector using the flow control valves 1208. This adaptability ensures that the system 1200 can operate at desirable conditions depending on the scale of the desalination process and the vacuum requirements at different stages. This also enhances resilience of the system 1200 to potential fluctuations in demand or environmental conditions, making it suitable for large-scale desalination operations. The use of multiple water ejectors, as opposed to air ejectors, generally allows for the creation of higher vacuum levels, which is particularly beneficial when dealing with high-salinity feed water. The stronger vacuum provides a greater driving force for vapor transport, overcoming the increased resistance caused by concentration polarization at the membrane surface.

Figure 13A:
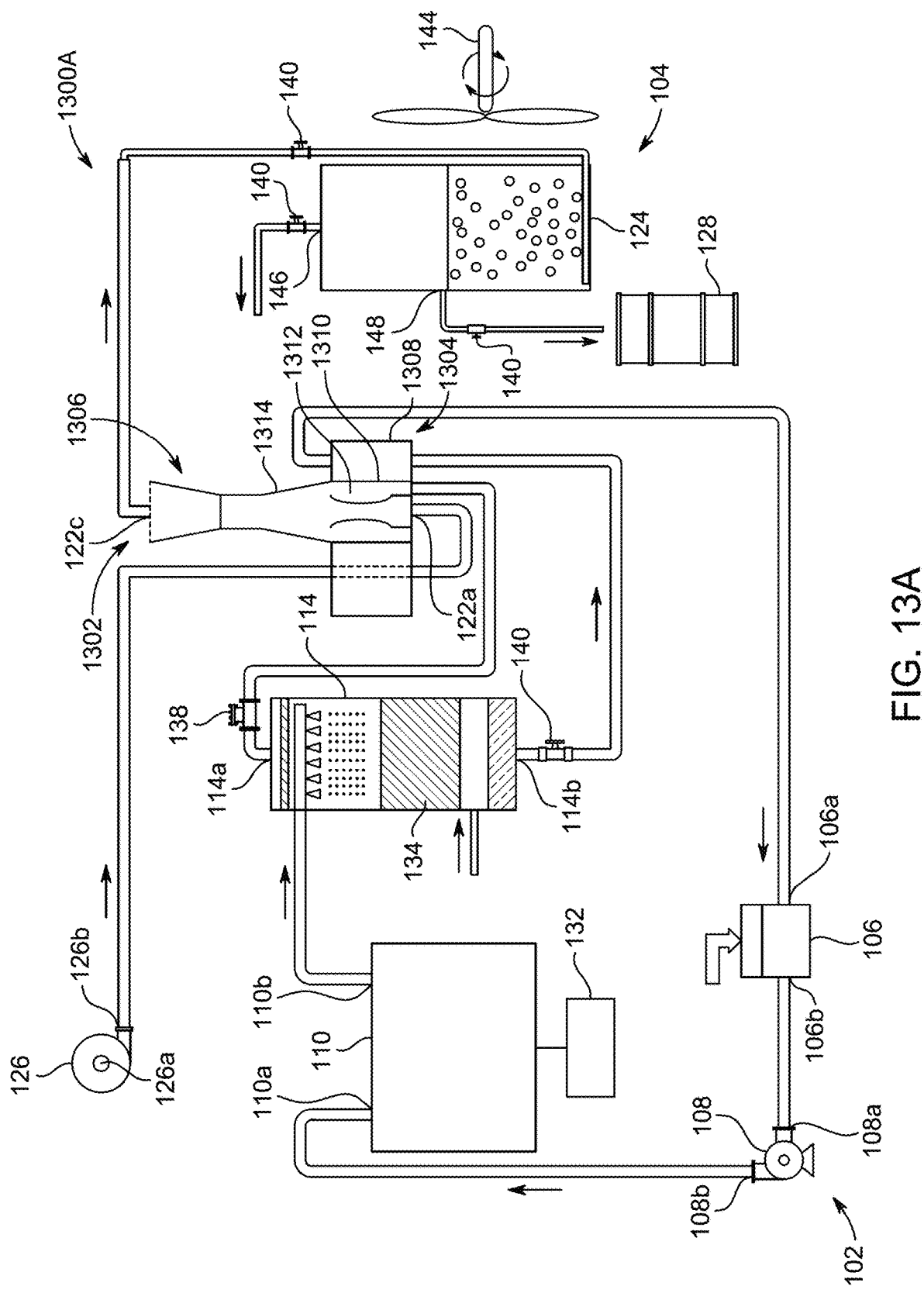
FIG. 13A is an exemplary schematic diagram of a system for water desalination utilizing an integrated distillation-ejector module in an open air configuration, according to certain embodiments.

Referring to FIG. 13A, illustrated is an exemplary schematic diagram of a system for water desalination (represented by reference numeral 1300A, and hereinafter referred to as "system 1300A"), according to certain embodiments. The system 1300A is similar to the system 100A of FIG. 1A in configuration. Similar or identical components are labeled with similar or identical numerals unless specified otherwise. Descriptions have been provided above and will be omitted for simplicity purposes.

The system 1300A includes an integrated distillation-ejector module 1302 also referred to as an integrated module 1302. This integrated module 1302 combines the functions of the membrane distillation unit and the water ejector into a single, compact unit. The system 1300A is shown in an open-air cycle configuration. The integrated module 1302 simplifies the system architecture and enhances vapor extraction efficiency. The system 1300A includes the feed tank 106, the water circulation pump 108, the heater 110, the humidifier 114 and the integrated distillation-ejector module 1302.

The integrated distillation-ejector module 1302 includes a distillation portion 1304 and an ejector portion 1306. The distillation portion 1304 includes a feed chamber 1308, a membrane 1310, and a vapor chamber 1312 (also referred to as a permeate chamber). The feed chamber 1308 is operationally connected to an outlet 114*b* of the humidifier 114. (Partially concentrated) Water exiting from the outlet 114*b* of the humidifier 114 enters the feed chamber 1308.

The membrane 1310 is a hydrophobic microporous membrane that is similar to the membrane 118 and repels water molecules while allowing water vapor to pass through. The membrane 1310 forms a part of the suction chamber of the ejector portion 1306. That is, a primary fluid stream (e.g. air exiting from the outlet 126*b* of the air blower 126) enters the first inlet 122*a* and accelerates in the ejector portion 1620, and a vacuum can be created in the vapor chamber 1312. As a result, a pressure differential can be created or enlarged across the membrane 1310 between the feed chamber 1308 and the vapor chamber 1312 so that the water vapor is sucked from the feed chamber 1308 across the membrane 1310 to the vapor chamber 1312 as a secondary fluid stream. The primary fluid stream and the secondary fluid stream can mix in the ejector portion 1306 and exit the outlet 122*c* of the ejector portion 1306 as a mixed stream containing the water vapor.

In some embodiments, the feed chamber 1308 and the membrane 1310 can be arranged as two concentric cylinders. Unlike the system 100A of FIG. 1A, the system 1300A does not require a separate vapor chamber or permeate chamber (e.g. 120), as the membrane 1310 itself acts as the interface between the feed water and the ejector suction. This configuration allows for direct vapor extraction through the membrane 1310 into the ejector portion 1306. The integration of the distillation and ejector functions in the integrated distillation-ejector module 1302 can lead to a more compact system design and potentially improved efficiency in the vapor extraction process. This is distinct from some embodiments where the membrane distillation unit (e.g. 112) and the ejector (e.g. 122) are separate components.

Moreover, the humidified carrier gas, also referred to as the wet gas, exits the outlet 114*a* of the humidifier 114 and enters the vapor chamber 1312. The humidified carrier gas can function as a sweeping gas for the membrane distillation process and form part of the secondary stream. As a result, the integrated distillation-ejector module 1302 may not need a separate sweeping gas inlet (e.g. 120*a*) for injecting a separate sweeping gas. Of course, an operator can include the inlet 120*a* as part of the integrated distillation-ejector module 1302 if desired.

Additionally, an exterior portion 1314 of the ejector portion 1306 adjacent to the membrane 1310 includes a different material from the membrane 1310. For instance, the exterior portion 1314 is not selectively permeable and is instead configured to contain and confine the primary fluid stream, the secondary fluid stream and the mixed stream.

In the system 1300A, the primary fluid stream and the secondary fluid stream mix within the ejector portion 1306 and exit as a mixed stream. This mixed stream is then directed to the bubble column dehumidifier 124 for freshwater recovery. The concentrated brine exits the feed chamber 1308 and is circulated back to the feed tank 106. The open-air cycle configuration means that air is drawn in from the atmosphere for the process and released back after dehumidification.

Figure 13B:
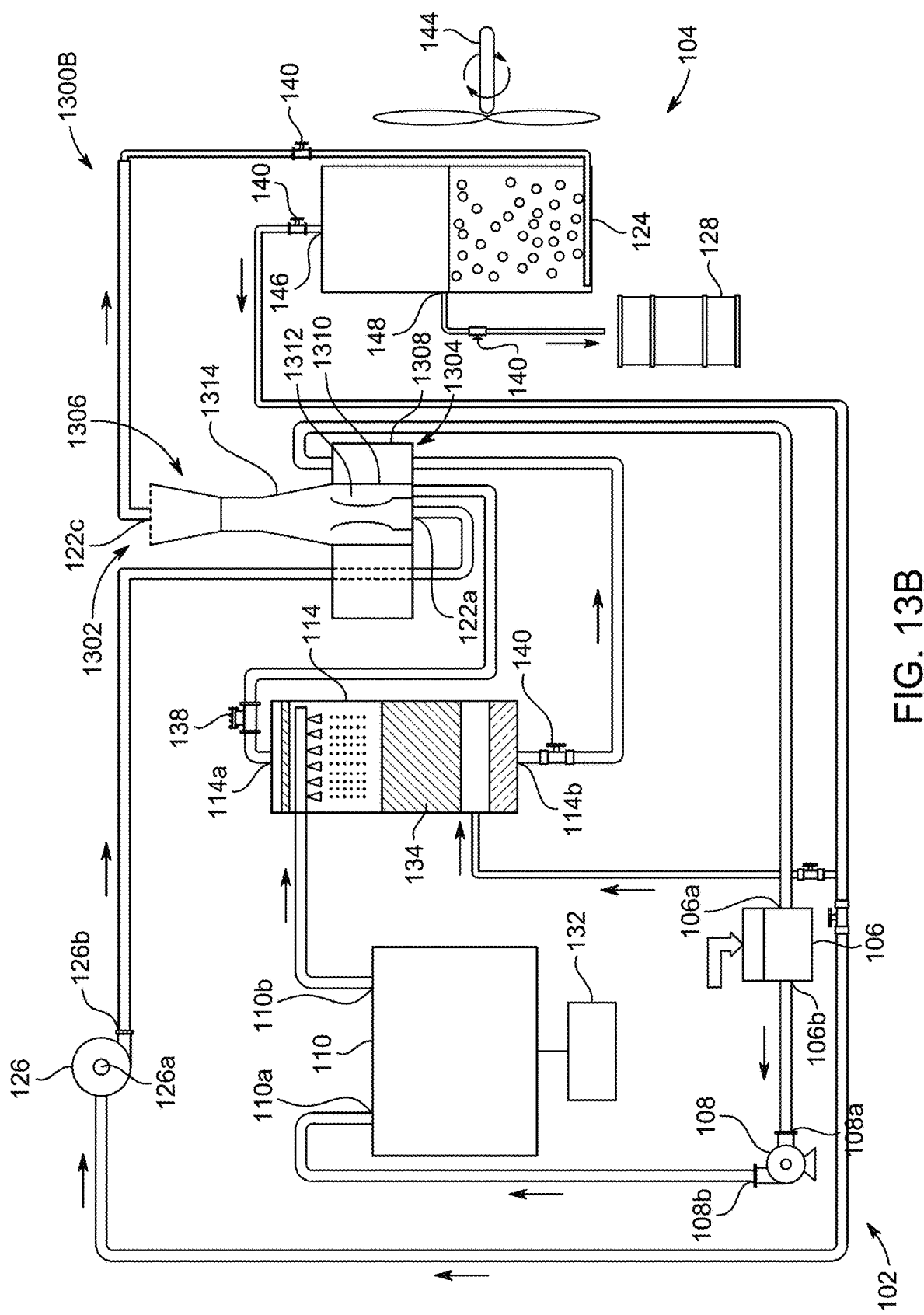
FIG. 13B is an exemplary schematic diagram of a system for water desalination utilizing an integrated distillation-ejector module in a closed air configuration, according to certain embodiments.

Referring to FIG. 13B, illustrated is an exemplary schematic diagram of a system for water desalination (represented by reference numeral 1300B, and hereinafter referred to as "system 1300B"), according to certain embodiments. The system 1300B is similar to the system 1300A of FIG. 13A, but it is configured in a closed-air cycle (similar to the system 100B of FIG. 1B). The system 1300B also includes the integrated distillation-ejector module 1302, combining the functions of membrane distillation and water ejection. Descriptions have been provided above and will be omitted for simplicity purposes. The closed-air cycle offers advantages in terms of system control and independence from ambient air conditions.

In the system 1300B, the air is (re-)circulated rather than released to the atmosphere. This recirculation is achieved through a connection between the vapor outlet 146 of the bubble column dehumidifier 124 and various inlets requiring air or gas. Similar descriptions have been provided above e.g. for FIG. 1B and will be omitted for simplicity purposes. The closed-air cycle provides greater control over the air quality and humidity within the system 1300B, making it less susceptible to variations in ambient conditions. This configuration also potentially improves energy efficiency by reducing the need to condition incoming air.

The systems for water desalination of the present disclosure may further include a control unit (discussed later in detail in reference to FIGS. 14-17) to enhance operational efficiency and stability. This control unit is configured to monitor and adjust parameters within the membrane module 102. Specifically, the control unit is configured to control at least one parameter selected from the group consisting of a temperature of the salt water in the heater 110, a flow rate of the salt water, and a water level in the feed tank 106. To achieve temperature control, the control unit receives input from a temperature sensor located within the heater 110 or at the outlet 110*b* of the heater 110. Based on this temperature reading and a predetermined setpoint, the control unit adjusts the power supplied to the heater 110, ensuring the salt water reaches and maintains the desired temperature for vapor production. For flow rate control, the control unit interacts with the water circulation pump 108, adjusting its speed to regulate the flow of salt water through the membrane module 102. This control may be based on pressure readings, flow meter measurements, or a combination of both. Further, to manage the water level in the feed tank 106, the control unit receives input from a level sensor within the feed tank 106. If the water level deviates from a predetermined setpoint, the control unit can activate or deactivate a make-up water supply to maintain the appropriate water level within the feed tank 106.

The systems for water desalination, with its various alternate embodiments described herein, integrates a humidification-dehumidification process with sweeping gas membrane distillation, driven by an ejector module. This integration of distinct desalination stages within a single system allows for enhanced vapor transfer and improved energy efficiency compared to systems employing these processes separately. The inclusion of a humidifier before the membrane distillation unit pre-conditions the salt water by increasing its water vapor content, thereby reducing the energy required for vaporization in the subsequent membrane distillation stage. Furthermore, the use of an ejector module, which can be configured with either air or water as the primary fluid, eliminates the need for mechanical vacuum pumps, simplifying the system architecture and reducing operational complexity. The connection of both the humidifier outlet and the permeate chamber outlet to the second inlet of the ejector allows for a combined secondary fluid stream, improving the vacuum effect and enhancing vapor extraction from both the humidifier and the membrane distillation unit. The bubble column dehumidifier, configured to receive the mixed stream from the ejector, efficiently recovers fresh water through condensation, and its output gas can be recycled to serve as the sweeping gas, the carrier gas, and the primary fluid stream, creating a closed-loop system that reduces external gas input and enhances resource utilization. The option to integrate the membrane distillation unit and the water ejector into a single module, where the membrane forms part of suction chamber of the ejector, further streamlines the design and improves vapor transfer efficiency.

The systems for water desalination of the present disclosure offers several improvements over conventional desalination approaches. The dual-stage process, combining humidification and membrane distillation, allows for the treatment of high-salinity water sources that are challenging for traditional reverse osmosis systems. The use of an ejector module, rather than mechanical vacuum pumps, reduces energy consumption and maintenance requirements, contributing to lower operational costs. The ability to recycle the gas discharged from the bubble column dehumidifier as the sweeping gas, carrier gas, and primary fluid stream reduces the need for external gas input and reduces environmental impact of the system. The modular design of the system, with options for multi-stage configurations of the humidifier, membrane distillation unit, and ejector, allows for scalability and adaptation to various operational requirements and feed water characteristics. The option of an integrated distillation-ejector module further reduces the system footprint and enhances vapor extraction. The incorporation of features like heat recovery, renewable energy integration, and control systems for temperature, flow rate, and water level further improves energy efficiency and operational control of the water desalination system. The capability to handle zero-liquid discharge applications and brine mining operations expands the applicability of the water desalination system beyond conventional freshwater production.

Figure 14:
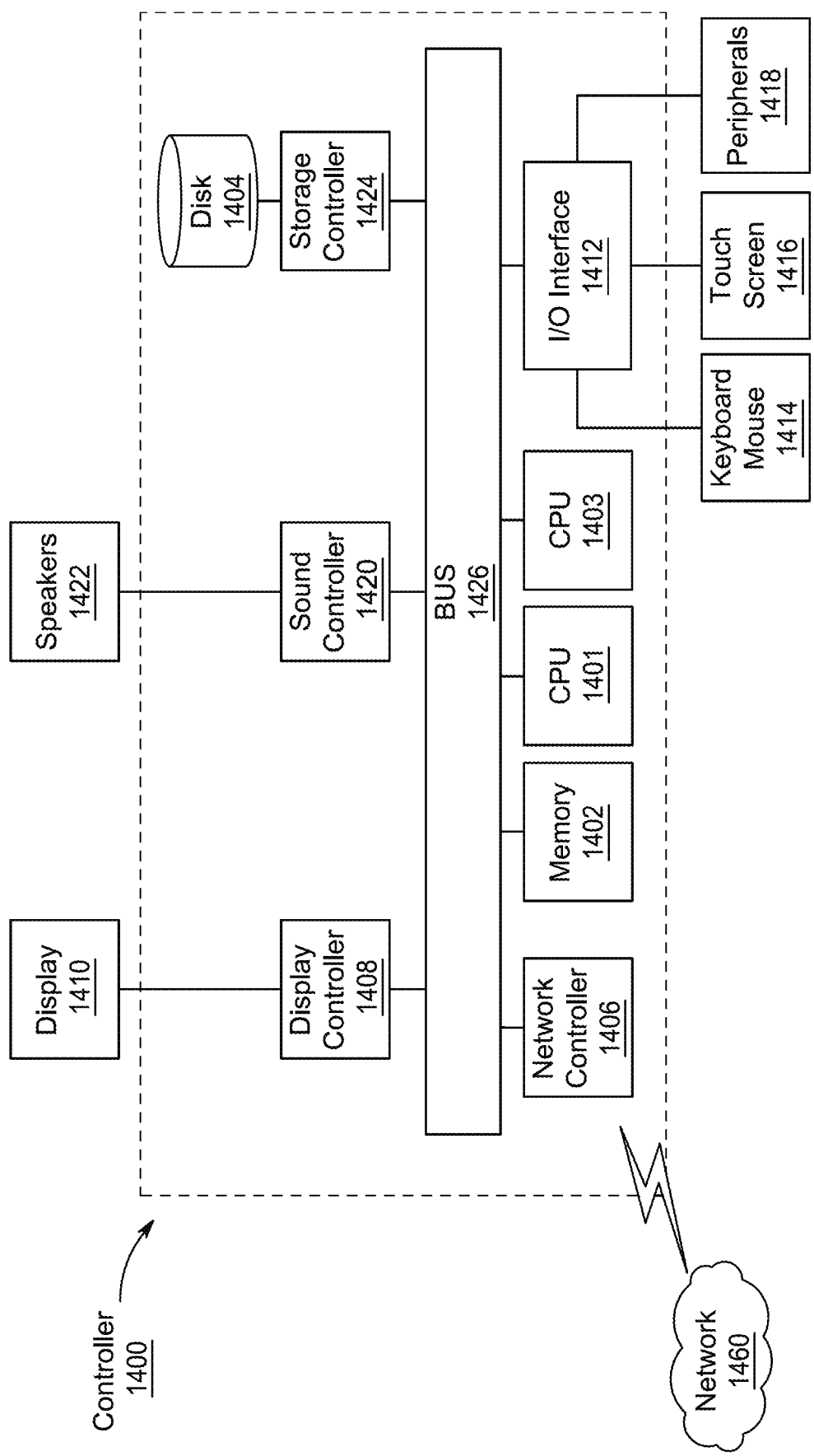
FIG. 14 is an illustration of a non-limiting example of details of computing hardware used in the computing system, according to certain embodiments.

Next, further details of the hardware description of the computing environment according to exemplary embodiments is described with reference to FIG. 14. In FIG. 14, a controller 1400 is described embodying the control unit of the system of the present disclosure, in which the controller is a computing device which includes a CPU 1401 which performs the processes described above/below. The process data and instructions may be stored in memory 1402. These processes and instructions may also be stored on a storage medium disk 1404 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 1401, 1403 and an operating system such as Microsoft Windows 7, Microsoft Windows 8, Microsoft Windows 10, UNIX, Solaris, LINUX, Apple MAC-OS and other systems known to those skilled in the art.

The hardware elements in order to achieve the computing device may be realized by various circuitry elements, known to those skilled in the art. For example, CPU 1401 or CPU 1403 may be a Xenon or Core processor from Intel of America or an Opteron processor from AMD of America, or may be other processor types that would be recognized by one of ordinary skill in the art. Alternatively, the CPU 1401, 1403 may be implemented on an FPGA, ASIC, PLD or using discrete logic circuits, as one of ordinary skill in the art would recognize. Further, CPU 1401, 1403 may be implemented as multiple processors cooperatively working in parallel to perform the instructions of the inventive processes described above.

The computing device in FIG. 14 also includes a network controller 1406, such as an Intel Ethernet PRO network interface card from Intel Corporation of America, for interfacing with network 1460. As can be appreciated, the network 1460 can be a public network, such as the Internet, or a private network such as an LAN or WAN network, or any combination thereof and can also include PSTN or ISDN sub-networks. The network 1460 can also be wired, such as an Ethernet network, or can be wireless such as a cellular network including EDGE, 3G, 4G and 5G wireless cellular systems. The wireless network can also be WiFi, Bluetooth, or any other wireless form of communication that is known.

The computing device further includes a display controller 1408, such as a NVIDIA GeForce GTX or Quadro graphics adaptor from NVIDIA Corporation of America for interfacing with display 1410, such as a Hewlett Packard HPL2445w LCD monitor. A general purpose I/O interface 1412 interfaces with a keyboard and/or mouse 1414 as well as a touch screen panel 1416 on or separate from display 1410. General purpose I/O interface also connects to a variety of peripherals 1418 including printers and scanners, such as an OfficeJet or DeskJet from Hewlett Packard.

A sound controller 1420 is also provided in the computing device such as Sound Blaster X-Fi Titanium from Creative, to interface with speakers/microphone 1422 thereby providing sounds and/or music.

The general purpose storage controller 1424 connects the storage medium disk 1404 with communication bus 1426, which may be an ISA, EISA, VESA, PCI, or similar, for interconnecting all of the components of the computing device. A description of the general features and functionality of the display 1410, keyboard and/or mouse 1414, as well as the display controller 1408, storage controller 1424, network controller 1406, sound controller 1420, and general purpose I/O interface 1412 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 15.

Figure 15:
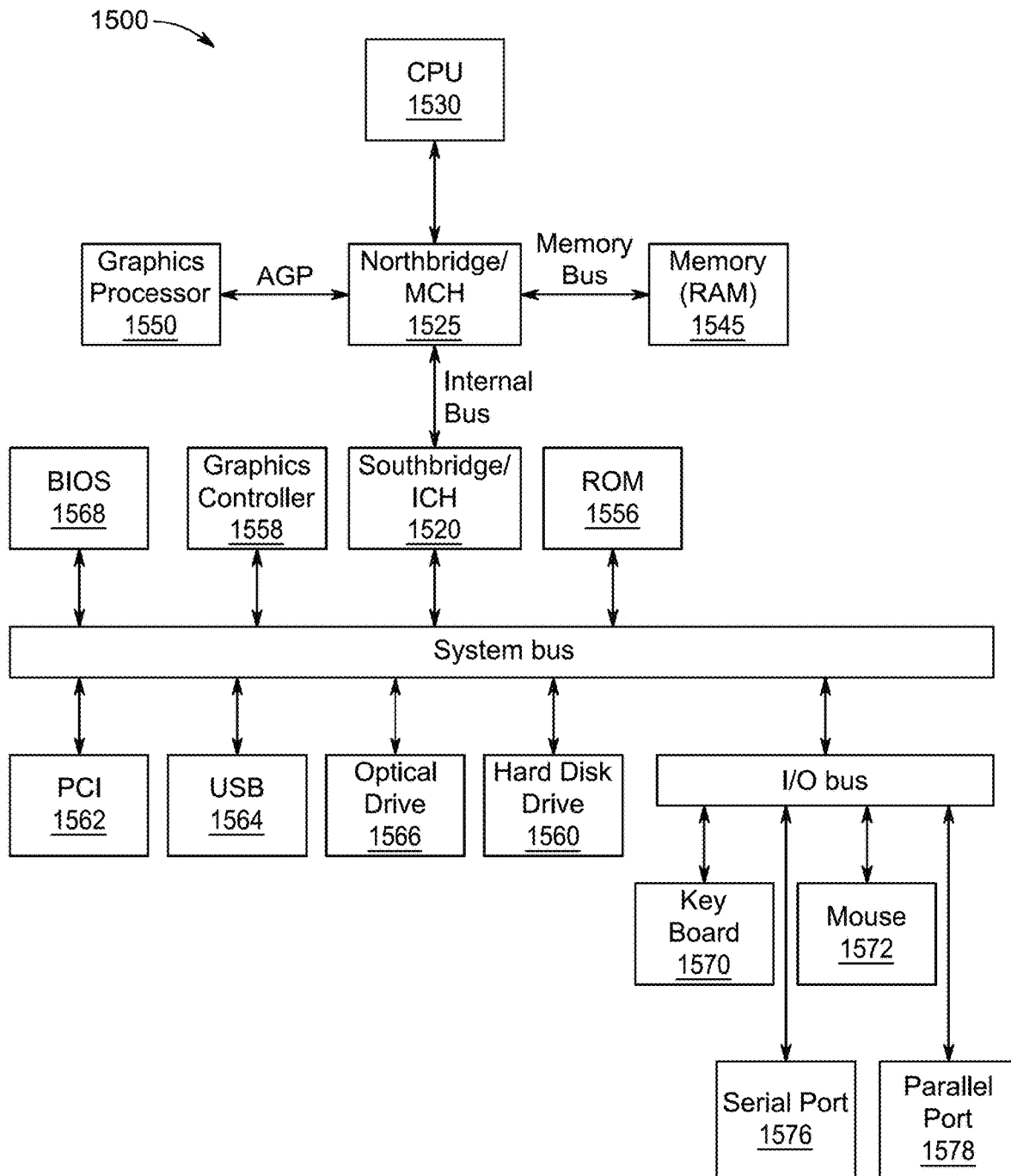
FIG. 15 is an exemplary schematic diagram of a data processing system used within the computing system, according to certain embodiments.

FIG. 15 shows a schematic diagram of a data processing system, according to certain embodiments, for performing the functions of the exemplary embodiments. The data processing system is an example of a computer in which code or instructions implementing the processes of the illustrative embodiments may be located.

In FIG. 15, data processing system 1500 employs a hub architecture including a north bridge and memory controller hub (NB/MCH) 1525 and a south bridge and input/output (I/O) controller hub (SB/ICH) 1520. The central processing unit (CPU) 1530 is connected to NB/MCH 1525. The NB/MCH 1525 also connects to the memory 1545 via a memory bus, and connects to the graphics processor 1550 via an accelerated graphics port (AGP). The NB/MCH 1525 also connects to the SB/ICH 1520 via an internal bus (e.g., a unified media interface or a direct media interface). The CPU Processing unit 1530 may contain one or more processors and even may be implemented using one or more heterogeneous processor systems.

Figure 16:
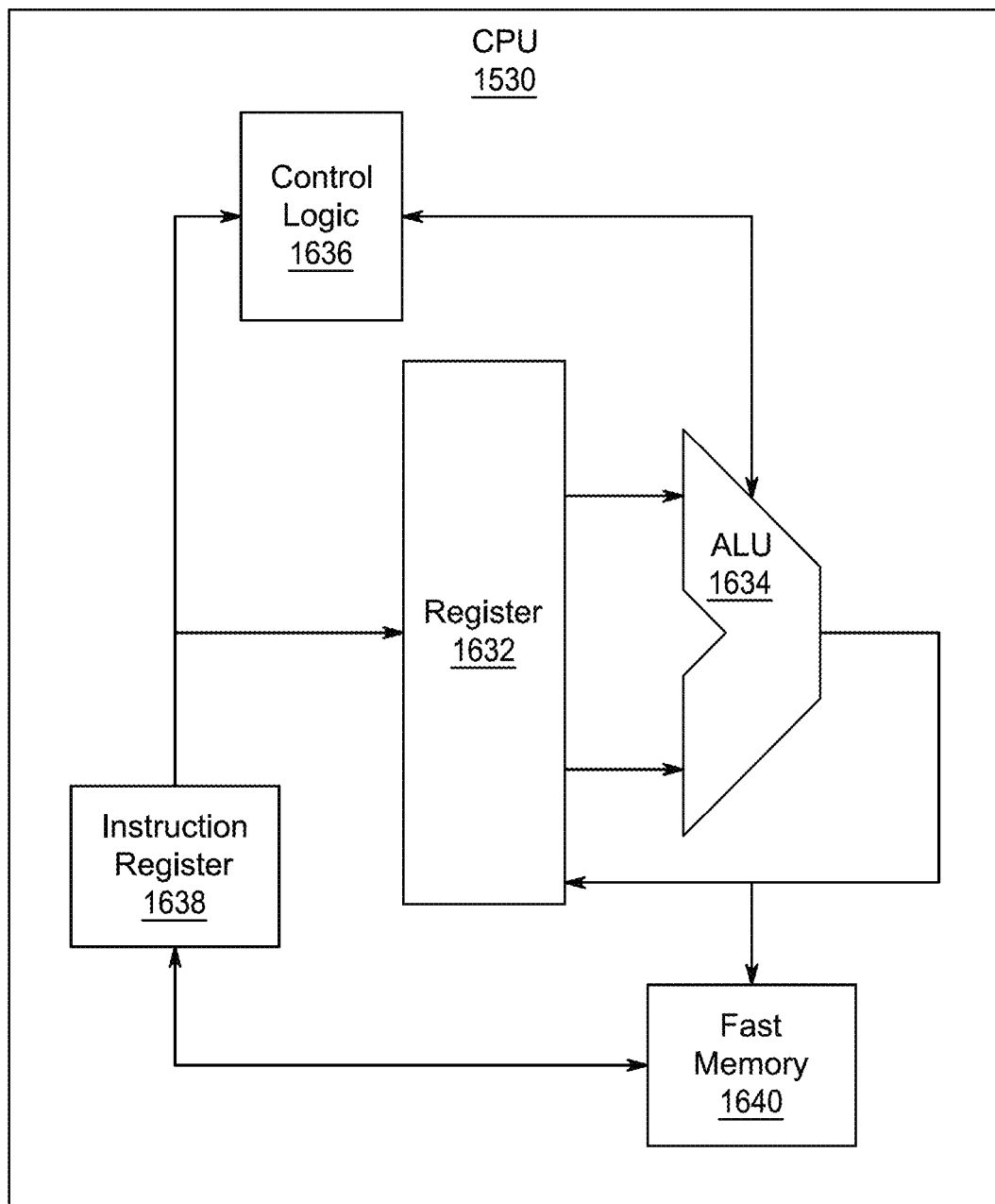
FIG. 16 is an exemplary schematic diagram of a processor used with the computing system, according to certain embodiments.

For example, FIG. 16 shows one implementation of CPU 1530. In one implementation, the instruction register 1638 retrieves instructions from the fast memory 1640. At least part of these instructions are fetched from the instruction register 1638 by the control logic 1636 and interpreted according to the instruction set architecture of the CPU 1530. Part of the instructions can also be directed to the register 1632. In one implementation the instructions are decoded according to a hardwired method, and in another implementation the instructions are decoded according a microprogram that translates instructions into sets of CPU configuration signals that are applied sequentially over multiple clock pulses. After fetching and decoding the instructions, the instructions are executed using the arithmetic logic unit (ALU) 1634 that loads values from the register 1632 and performs logical and mathematical operations on the loaded values according to the instructions. The results from these operations can be feedback into the register and/or stored in the fast memory 1640. According to certain implementations, the instruction set architecture of the CPU 1530 can use a reduced instruction set architecture, a complex instruction set architecture, a vector processor architecture, a very large instruction word architecture. Furthermore, the CPU 1530 can be based on the Von Neuman model or the Harvard model. The CPU 1530 can be a digital signal processor, an FPGA, an ASIC, a PLA, a PLD, or a CPLD. Further, the CPU 1530 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 15, the data processing system 1500 can include that the SB/ICH 1520 is coupled through a system bus to an I/O Bus, a read only memory (ROM) 1556, universal serial bus (USB) port 1564, a flash binary input/output system (BIOS) 1568, and a graphics controller 1558. PCI/PCIe devices can also be coupled to SB/ICH 1588 through a PCI bus 1562.

The PCI devices may include, for example, Ethernet adapters, add-in cards, and PC cards for notebook computers. The Hard disk drive 1560 and CD-ROM 1566 can use, for example, an integrated drive electronics (IDE) or serial advanced technology attachment (SATA) interface. In one implementation the I/O bus can include a super I/O (SIO) device.

Further, the hard disk drive (HDD) 1560 and optical drive 1566 can also be coupled to the SB/ICH 1520 through a system bus. In one implementation, a keyboard 1570, a mouse 1572, a parallel port 1578, and a serial port 1576 can be connected to the system bus through the I/O bus. Other peripherals and devices that can be connected to the SB/ICH 1520 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry or based on the requirements of the intended back-up load to be powered.

Figure 17:
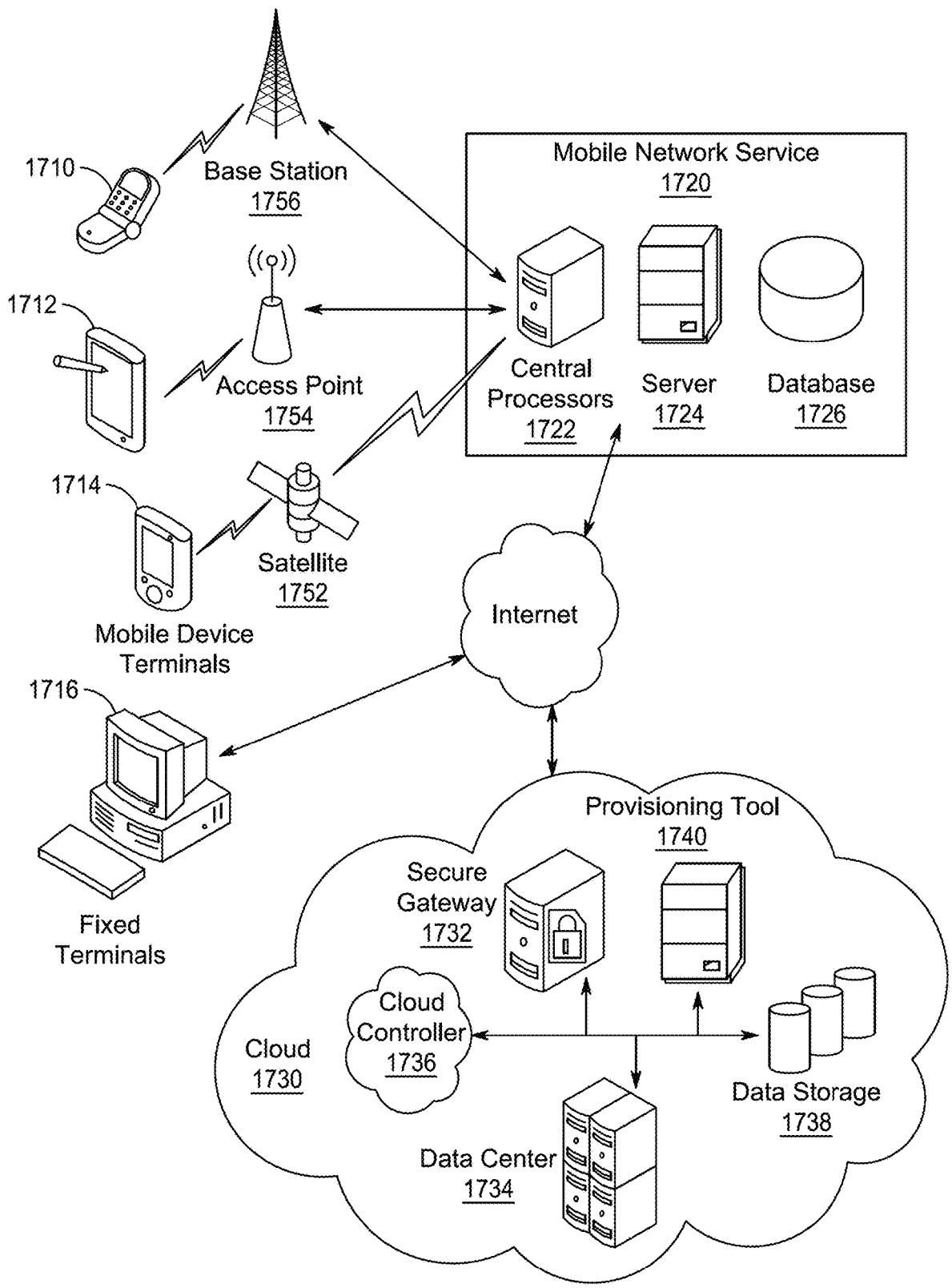
FIG. 17 is an illustration of a non-limiting example of distributed components which may share processing with the controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, such as cloud 1730 including a cloud controller 1736, a secure gateway 1732, a data center 1734, data storage 1738 and a provisioning tool 1740, and mobile network services 1720 including central processors 1722, a server 1724 and a database 1726, which may share processing, as shown by FIG. 17, in addition to various human interface and communication devices (e.g., display monitors 1716, smart phones 1710, tablets 1712, personal digital assistants (PDAs) 1714). The network may be a private network, such as a LAN, satellite 1752 or WAN 1754, or be a public network, may such as the Internet. Input to the system may be received via direct user input and received remotely in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

Numerous modifications and variations of the present disclosure are possible in light of the above teachings. It is therefore to be understood that within the scope of the appended claims, the invention may be practiced otherwise than as specifically described herein.

The invention claimed is:

1. A system for water desalination, comprising:
   a membrane module, comprising:
     a feed tank configured to receive salt water,
     a heater configured to heat the salt water from the feed tank,
     a humidifier configured to receive the salt water from the heater and a carrier gas to form a wet gas comprising the carrier gas and water moisture from the salt water, and
     a membrane distillation unit comprising in order, a feed chamber, a membrane and a permeate chamber, wherein the feed chamber is configured to receive the salt water from the humidifier, the membrane is configured to let water vapor pass from the feed chamber through the membrane to the permeate chamber, and the permeate chamber includes an inlet configured to receive a sweeping gas; and
   an ejector module, comprising:
     an ejector including a first inlet configured to receive a primary fluid stream and a second inlet configured to receive a secondary fluid stream so that the primary fluid stream and the secondary fluid stream mix to form a mixed stream, and
     a bubble column dehumidifier configured to receive the mixed stream to form fresh water,
   wherein the second inlet of the ejector is connected to an outlet of the humidifier and an outlet of the permeate chamber so that the ejector is configured to receive the wet gas and the sweeping gas as the secondary fluid stream,
   wherein the membrane distillation unit and the ejector form an integrated distillation-ejector module, where the membrane separates a suction chamber of the ejector and the feed chamber of the membrane distillation unit on two opposing sides of the membrane, and the permeate chamber is part of the suction chamber.

2. The system of claim 1, wherein the bubble column dehumidifier is configured to discharge a remaining gas of the mixed stream, which is divided into at least three separate portions that are recycled respectively as the sweeping gas, the carrier gas and the primary fluid stream.

3. The system of claim 1, wherein the humidifier comprises a packed bed humidifier configured to spray the salt water onto a packed bed.

4. The system of claim 1, wherein the sweeping gas is air.

5. The system of claim 4, wherein the inlet of the permeate chamber is configured to receive the air from a surrounding environment.

6. The system of claim 5, wherein the inlet of the permeate chamber includes a pressure valve configured to regulate flow of the air.

7. The system of claim 1, wherein the membrane is a hydrophobic microporous membrane.

8. The system of claim 1, wherein the membrane module further comprises a water circulation pump.

9. The system of claim 8, wherein:
an outlet of the feed tank is operationally connected to an inlet of the water circulation pump,
an outlet of the water circulation pump is operationally connected to an inlet of the heater,
an outlet of the heater is operationally connected to an inlet of the feed chamber, and
an outlet of the feed chamber is operationally connected to an inlet of the feed tank.

10. The system of claim 1, wherein:
the primary fluid stream comprises air, and
the ejector module further comprises an air blower.

11. The system of claim 10, wherein:
an inlet of the air blower is configured to receive the air from a surrounding environment,
an outlet of the air blower is operationally connected to the first inlet of the ejector, and
an outlet of the ejector is operationally connected to an inlet of the bubble column dehumidifier.

12. The system of claim 11, wherein the bubble column dehumidifier comprises n number of stages, wherein:
n is an integer from 1 to 100,
each stage comprises a bubble column,
a first stage is operationally connected to the outlet of the ejector to receive the mixed stream and is configured to capture a portion of the water vapor in the mixed stream to form desalinated water,
each bubble column comprises a vapor outlet through which a portion of the water vapor that is not captured in one stage is configured to pass to a next stage, and
each bubble column comprises a desalinated water outlet operationally connected to the bubble column dehumidifier to collect the desalinated water.

13. The system of claim 12, further comprising a fan that is adjacent to the bubble column dehumidifier.

14. The system of claim 12, wherein a vapor outlet of a bubble column of a final stage of the bubble column dehumidifier is operationally connected to the inlet of the air blower.

15. The system of claim 1, wherein the ejector includes a bottleneck structure configured to receive the primary fluid stream from the first inlet.

16. The system of claim 1, wherein the ejector is a single ejector or a multi-stage ejector arranged in series, in parallel or both.

17. The system of claim 1, wherein the carrier gas is configured in an open or closed air cycle.

18. The system of claim 1, wherein an outlet of the membrane distillation unit is connected to an inlet of the feed tank so that heat is recovered from the membrane distillation unit to the feed tank.

19. The system of claim 1, wherein the system includes a water-ejector loop having instant condensation and an open reservoir for re-circulation or de-aeration, which separate from a saline loop.

20. A system for water desalination, comprising:
a feed tank configured to receive salt water;
a heater configured to heat the salt water from the feed tank;
a humidifier configured to receive the salt water from the heater and a carrier gas to form a wet gas comprising the carrier gas and water moisture from the salt water;
an integrated distillation-ejector module, comprising:
an ejector portion including
a first inlet configured to receive a primary fluid stream,
a suction chamber having a second inlet configured to receive the wet gas from the humidifier, and
a membrane, and
a distillation portion including a feed chamber having a third inlet configured to receive the salt water from the humidifier, wherein the membrane separates the suction chamber and the feed chamber on two opposing sides of the membrane, the membrane is configured to let water vapor pass from the feed chamber through the membrane to the suction chamber, and the primary fluid stream, the wet gas and the water vapor mix to form a mixed stream; and
a bubble column dehumidifier configured to receive the mixed stream to form fresh water.

* * * * *